United States Patent

Koyama

[11] Patent Number: 6,112,213
[45] Date of Patent: *Aug. 29, 2000

[54] IMAGE PROCESSING METHOD AND APPARATUS FOR DESIGNATING MOVEMENT AND COPYING OF IMAGE DATA

[75] Inventor: Shigeki Koyama, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/605,668

[22] Filed: Feb. 22, 1996

[30] Foreign Application Priority Data

Feb. 23, 1995 [JP] Japan .................................. 7-035335

[51] Int. Cl.⁷ ............................................. G06F 17/24
[52] U.S. Cl. ........................ 707/502; 707/509; 707/530; 345/339
[58] Field of Search .................................. 395/763, 764, 395/770, 782, 792, 802, 803, 141, 334, 339; 345/118, 121, 123, 125, 127, 131, 441, 334, 339; 707/502, 503, 509, 520, 530, 539, 540

[56] References Cited

U.S. PATENT DOCUMENTS

| | | | |
|---|---|---|---|
| 5,187,776 | 2/1993 | Yanker | 395/341 |
| 5,307,451 | 4/1994 | Clark | 395/127 |
| 5,442,739 | 8/1995 | Saito | 395/138 |
| 5,457,755 | 10/1995 | Ishida et al. | 382/324 |
| 5,485,565 | 1/1996 | Saund et al. | 395/142 |
| 5,513,309 | 4/1996 | Meier et al. | 395/339 |
| 5,553,224 | 9/1996 | Saund et al. | 395/133 |
| 5,576,847 | 11/1996 | Sekine et al. | 358/448 |
| 5,594,853 | 1/1997 | Salesin et al. | 395/141 |
| 5,638,464 | 6/1997 | Kawamura | 382/232 |
| 5,652,851 | 7/1997 | Stone et al. | 395/346 |

FOREIGN PATENT DOCUMENTS

| | | |
|---|---|---|
| 0561076 | 4/1993 | European Pat. Off. . |
| 5-265437 | 10/1993 | Japan . |
| 236011 | 12/1994 | Taiwan . |

OTHER PUBLICATIONS

*Microsoft® Office 6–in–1*, New Edition, Que Corporation, 1994, pp. 279–286.

*Primary Examiner*—Stephen S. Hong
*Attorney, Agent, or Firm*—Fitzpatrick, Cella, Harper & Scinto

[57] ABSTRACT

Editing of a displayed image is performed with simple operations. The editing is made by specifying an edit-start and edit-end points in an edit area of a displayed image, designating a movement area and movement destination based on the edit-start and edit-end points, designating a copy area and copy destination based on the edit-start and edit-end points, then moving the movement area to the movement destination and copying the copy area at the copy destination.

47 Claims, 19 Drawing Sheets

IMAGE PROCESSING METHOD AND APPARATUS FOR DESIGNATING MOVEMENT AND COPYING OF IMAGE DATA

BACKGROUND OF THE INVENTION

Field of the Invention

This invention relates to an image processing method and apparatus for designating movement and copying of image data to obtain desired edited image data.

In a device which displays bitmap data in the form of a matrix for editing the displayed data, to deform the data with a desired row or column as the base of deformation, the row or column is extended in a lateral or vertical direction, by inserting row(s) or column(s) into the position to be extended and filling the inserted blank row(s) or column(s) by copying the bitmap-data or drawing.

According to this method, deformation by copying is made by sequentially performing an operation of inserting row(s) or column(s), an operation of designating an area to be copied, and an operation of designating an area for pasting the copied data. In case of deformation by drawing, the operation of inserting row(s) or column(s) and the following operations of drawing are repeated for the completion of desired image data.

However, in the above device, to perform deformation where a base row or column of bitmap data is extended in a lateral or vertical direction, the order of the operations of row/column-insertion, copied-area designation, and paste-area designation must be observed, or the operations of row/column-insertion and drawing must be repeated until a desired image data is obtained, which increases the number of operations.

SUMMARY OF THE INVENTION

Accordingly, the present invention has been made to solve the above problem and has its object to provide an image processing method and apparatus capable of reducing the number of operations in deformation, where bitmap data is deformed with a desired row or column as the base of deformation, by extending the base row or column in a lateral or vertical direction.

According to the present invention, the foregoing object is attained by providing an image processing method comprising: a first designation step of designating an edit-start point on an edit area of a displayed image; a second designation step of designating an edit-end point on the edit area; a first specifying step of specifying a movement area to be moved and a movement destination; a second specifying step of specifying a copy area to be copied and a copy destination; a movement step of moving the movement area to the movement destination specified at the first specifying step; and a copying step of copying the copy area at the copy destination specified at the second specifying step.

Further, the foregoing object is attained by providing an image processing apparatus comprising: first designation means for designating an edit-start point on an edit area of a displayed image; second designation means for designating an edit-end point on the edit area; first specifying means for specifying a movement area to be moved and a movement destination; second specifying means for specifying a copy area to be copied and a copy destination; movement means for moving the movement area to the movement destination specified at the first specifying means; and copying means for copying the copy area at the copy destination specified at the second specifying means.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the designation, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
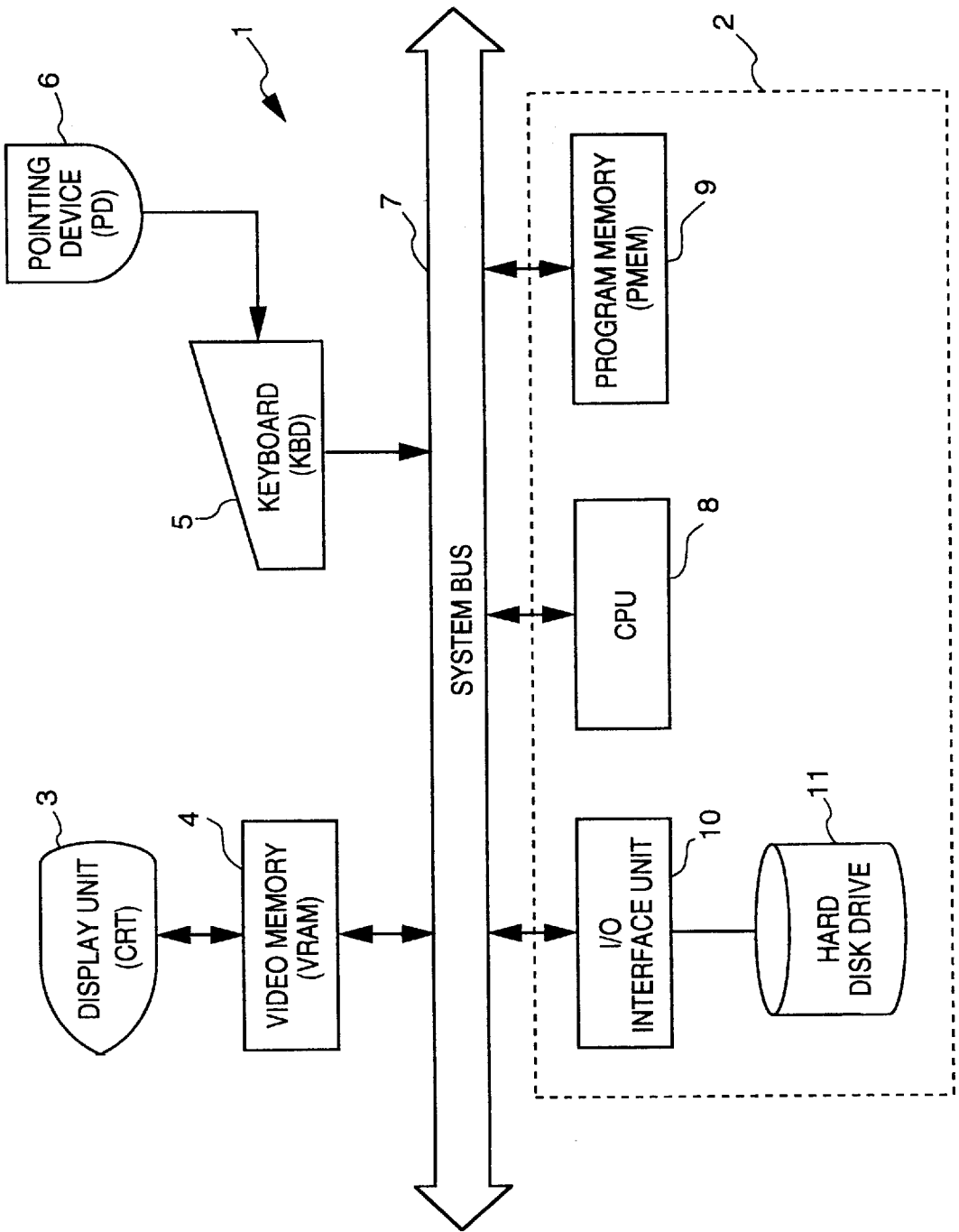
FIG. 1 is a block diagram showing the configuration of an image processing apparatus according to a first embodiment of the present invention.

FIG. 1 is a block diagram showing the construction of an image processing apparatus according to a first embodiment of the present invention. In FIG. 1, reference numeral 1 denotes the image processing apparatus; 2, a controller; 3, a display unit (CRT); 4, a video memory (VRAM); 5, a keyboard (KBD); and 6, a pointing device (PD). These main constituting elements are connected via a system bus 7.

The control unit 2 controls the overall apparatus 1. The control unit 2 has a CPU 8 such as a microprocessor, a program memory (PMEM) 9 comprising an RAM (random-access memory) or the like, an I/O interface unit 10 and a hard disk drive 11. The CPU 8 controls the overall apparatus 1 in accordance with a program shown in the flowchart of FIG. 2. The program memory 9 holds programs, and provides a temporary storage area as a work area for the CPU 8 upon execution of control, for storing various data such as edit data. The I/O interface unit 10 performs interface-control between the hard disk drive 11. The hard disk drive 11 is a storage device for reading and writing data from/into a magnetic recording medium on the disk.

The display unit 3, comprising a CRT (cathode-ray tube) or the like, displays various image data generated or edited in the image processing apparatus 1 and message for an operator. The video memory 4 maps data to be displayed on the screen of the display unit 3. The keyboard 5 and the pointing device 6 are manipulated by the operator for inputting various data and commands. The operator can move a cursor in a screen image on the display unit 3 in an arbitrary direction by using the keyboard 5 and/or the pointing device 6. Further, the operator can designate a command by selecting a command image from a command menu by using the keyboard 5 or the pointing device 6.

Next, editing processing by the image processing apparatus having the above construction will be described with reference to the flowchart of FIG. 2. Note that the control program for executing this processing is stored in the program memory 9 of the control unit 2. The editing processing starts in a state where an area to be edited is displayed on the display unit 3 with an image as the object of the editing.

In the first embodiment, the editing is made on a rectangular edit area (cell of a matrix bitmap data) base, by merely designating two points (start point and end point) of the edit area as the objects of the editing. If the rectangular edit area is long in the row-direction (length<width), the entire column of the edit area including the start point is moved toward the end point, and the column including the start point is copied in the vacant column(s) inserted between the start point and the end point, as a result of movement, thus filling the inserted column(s) with data. On the other hand, if the rectangular edit area is long in the column-direction (length>width), the entire row of the edit area including the start point is moved toward the end point, and the row including the start point is copied in the vacant row(s) inserted between the start point and the end point, as a result of movement, thus filling the inserted row(s) with data.

First, at step S201, on an edit area displayed on the display unit 3, an edit-start point is designated by using the keyboard 5 or the pointing device 6, and at step S202, on the edit area displayed on the display unit 3, an edit-end point is designated by using the keyboard 5 or the pointing device 6. At step S203, the area to be moved (movement area) and a movement destination are specified with the edit-start point and the edit-end point respectively designated at steps S201 and S202.

Next, at step S204, the area to be copied (copy area) and a copy destination are specified with the edit-start point and the edit-end point respectively designated at steps S201 and S202. Then at step S205, the movement area specified at step S203 is moved in accordance with the movement-start point and the movement-end point specified at step S203. Finally at step S206, the copy area specified at step S204 is copied in accordance with the start point and end point.

Next, specifying of movement area and movement destination performed at step S203 in FIG. 2 will be described with reference to FIGS. 3, 6, 8, 10 and 12.

Figure 2:
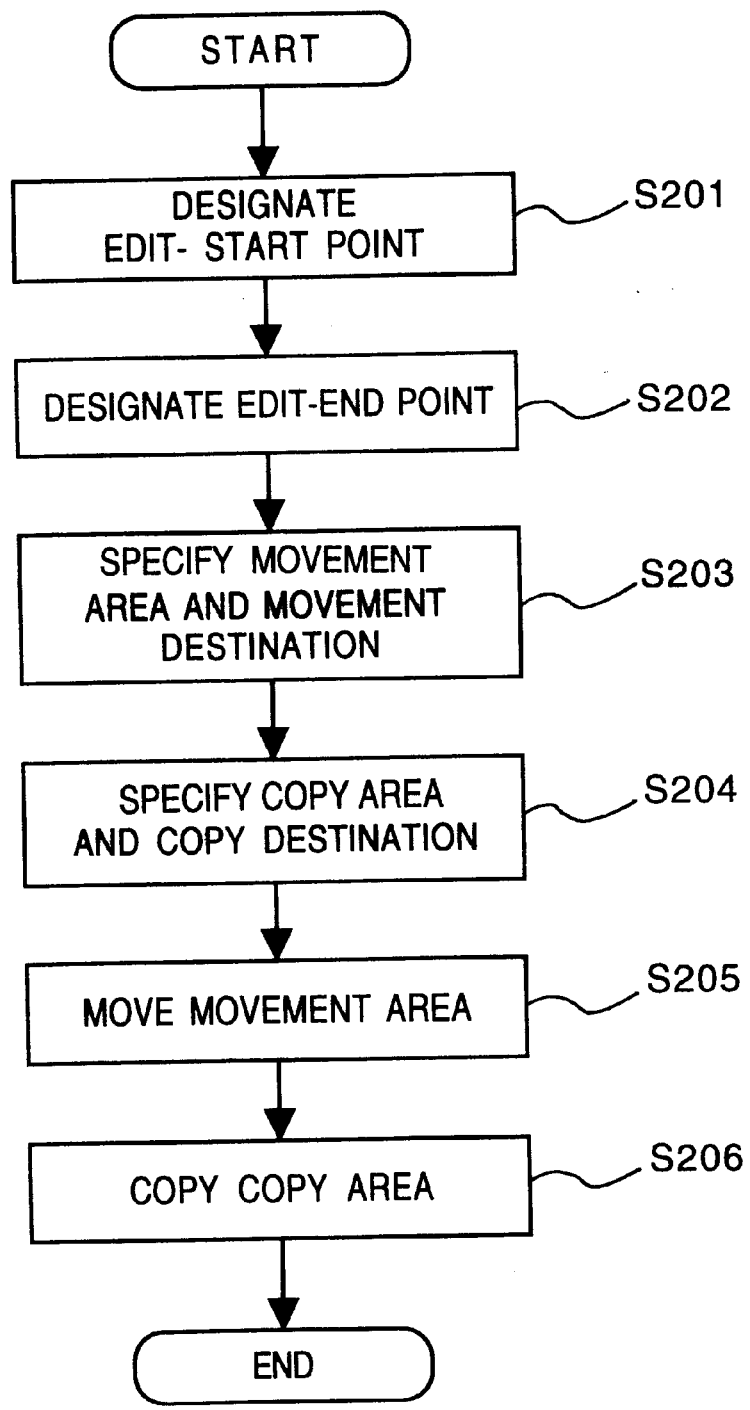
FIG. 2 is a flowchart showing editing processing by the image processing apparatus according to the first embodiment.
Figure 3:
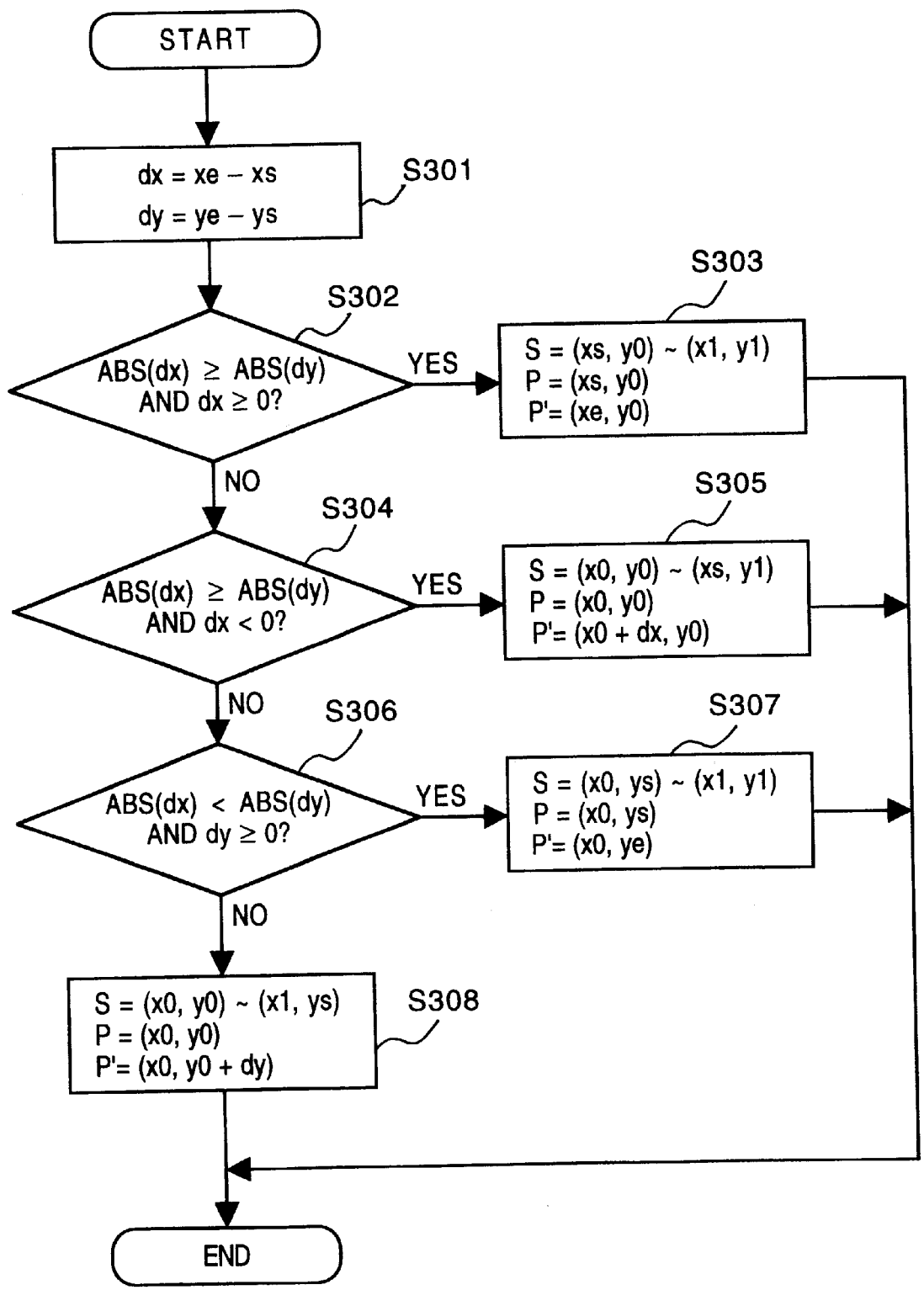
FIG. 3 is a flowchart showing processing to designate an area to be moved and a movement destination according to the first embodiment.

FIG. 3 is a flowchart showing the processing to specify a movement area and a movement destination. FIGS. 6, 8, 10 and 12 show character image data in an edit area displayed on the display unit 3. In these figures, a point P0 is a upper left point of the edit area; P1, a lower right point of the edit area; Ps, the edit-start point designated at step S201 in FIG. 2; and Pe, the edit-end point designated at step S202 in FIG. 2.

The coordinates of the point P0 is (x0, y0); the coordinates of the point P1, (x1, y1); the coordinates of the point Ps, (xs, ys); and the coordinates of the point Pe, (xe, ye). The absolute values of the X- and Y-coordinate differences dx, dy are expressed by ABS(dx), ABS(dy). Further, point P is a movement-start point; and point P', a movement-end point as a new base point after movement. The movement area is moved such that the point P becomes the point P'.

First, at step S301, the difference between the X-coordinates of the points Ps and Pe and that between the Y-coordinates of the points Ps and Pe are respectively obtained from:

$$dx=xe-xs, \ dy=ye-y$$

Figure 6:
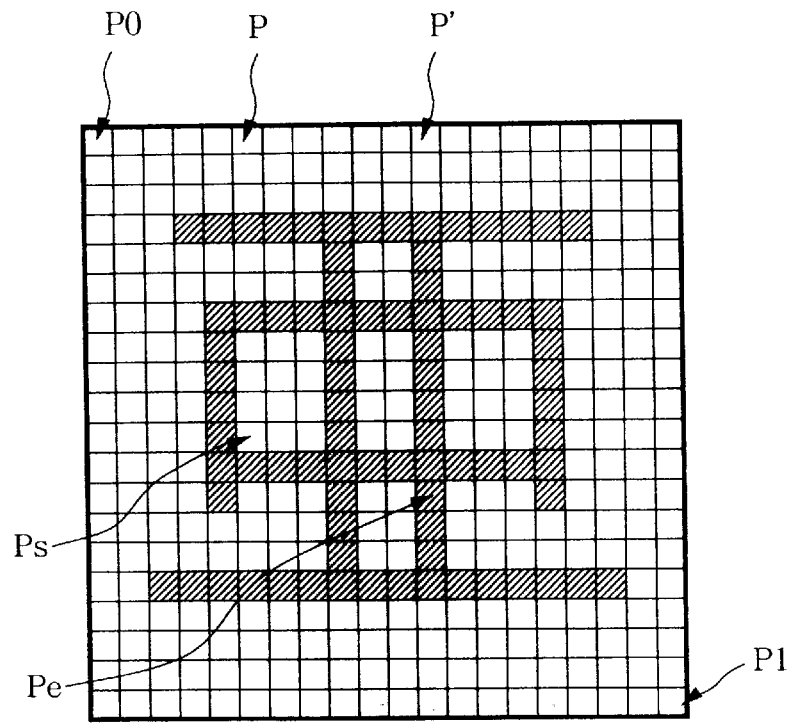
FIG. 6 is an example of character image data as an edit area with points necessary for the editing processing according to the first embodiment.

The process proceeds to step S302, at which whether or not ABS(dx)≧ABS(dy) and dx≧0 holds is determined. If YES, the process proceeds to step S303, a movement area S is specified as a rectangular area defined by a point P(xs, y0) and a point P'(x1, y1). The movement-start point P of the movement area S is specified by the coordinates (xs, y0); and the movement-end point P' is specified by the coordinates (xe, y0). FIG. 6 shows the displayed character image data with the movement area and the movement-start and movement-end points designated at step S303.

Figure 8:
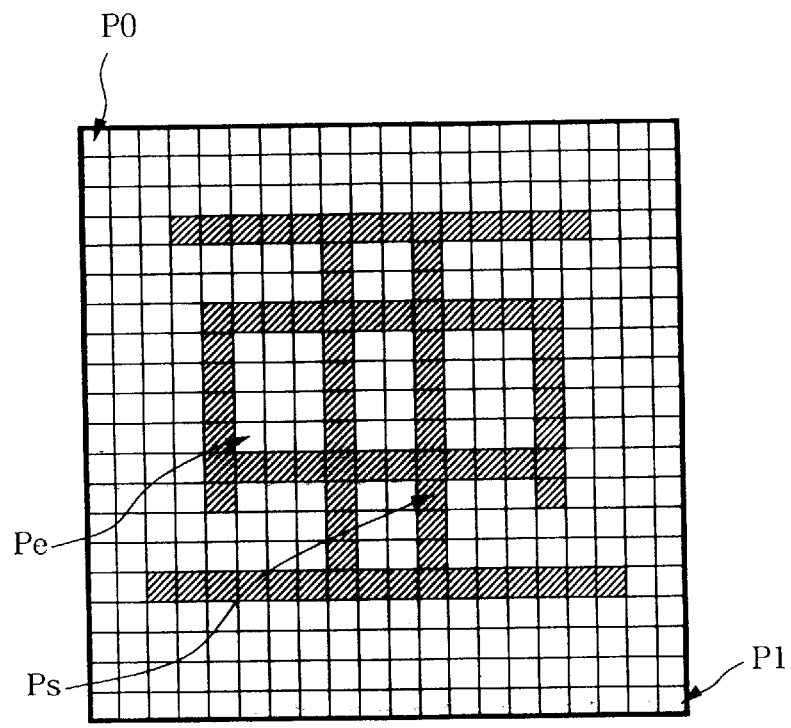
FIG. 8 is another example of character image data as an edit area with points necessary for the editing processing according to the first embodiment.

At step S302, if ABS(dx)≧ABS(dy) and dx≧0 does not hold, the process proceeds to step S304, at which whether or not ABS(dx)≧ABS(dy) and dx<0 holds is determined. If YES, the process proceeds to step S305, at which the movement area S is designated as a rectangular area defined by a point (x0, y0) and a point (xs, y1). The movement-start point P of the movement area S is designated by the coordinates (x0, y0); and the movement-end point P' is designated by the coordinates (x0+dx, y0). FIG. 8 shows the displayed character image data with the movement area and the movement-start and movement-end points designated at step S305.

Figure 10:
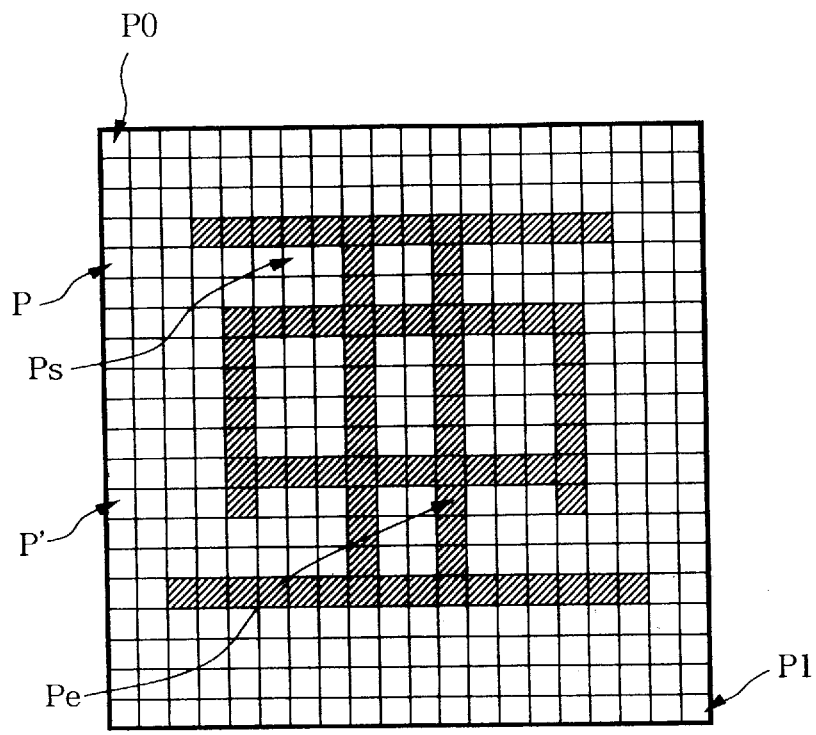
FIG. 10 is another example of character image data as an edit area with points necessary for the editing processing according to the first embodiment.

At step S304, if ABS(dx)≧ABS(dy) and dx<0 does not hold, the process proceeds to step S306, at which whether or not ABS(dx)<ABS(dy) and dy≧0 holds is determined. If YES, the process proceeds to step S307, at which the movement area S is designated as a rectangular area defined by a point (x0, ys) and a point (x1, y1). The movement-start point P of the movement area S is designated by the coordinates (x0, ys); and the movement-end point P' is designated by the coordinates (x0, ye). FIG. 10 shows the displayed character image data with the movement area and the movement-start and movement-end points specified at step S307.

Figure 12:
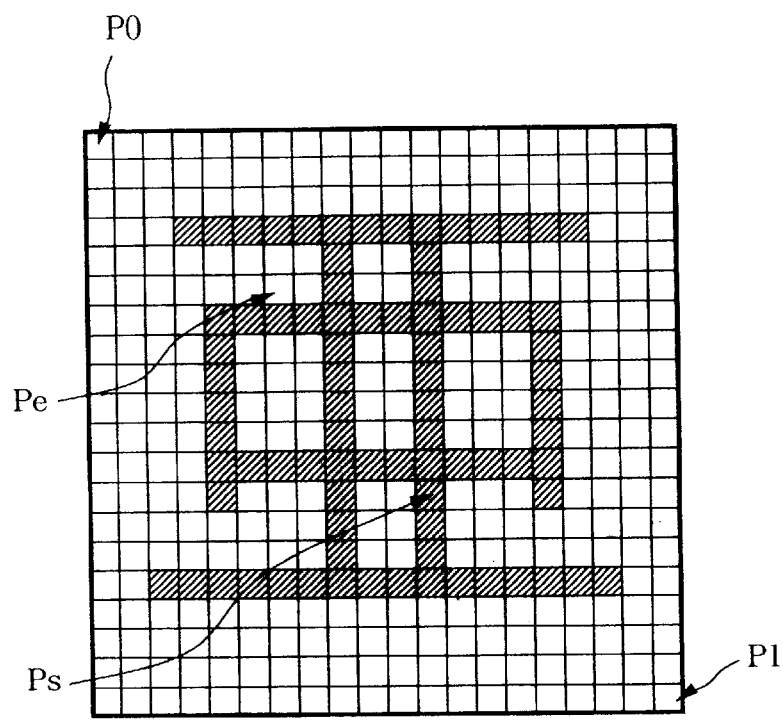
FIG. 12 is another example of character image data as an edit area with points necessary for the editing processing according to the first embodiment.

At step S306, if ABS(dx)<ABS(dy) and dx≧0 does not hold, the process proceeds to step S308, at which the movement area S is specified as a rectangular area defined by a point (x0, y0) and a point (x1, ys). The movement-start point P of the movement area S is specified by the coordinates (x0, y0); and the movement-end point P' is designated by the coordinates (x0, y0+dy). FIG. 12 shows the displayed character image data with the movement area and the movement-start and movement-end points specified at step S308.

Next, specifying of copy area and copy destination performed at step S204 in FIG. 2 will be described with reference to the flowchart of FIG. 4.

Note that copying is made, with a point Q as the copy-start point; N, the number of copy-end points, i.e., the number of copying operations; and Qi(i=0 . . . N−1), the respective base points after copying operations, from the point Q to the points Qi (i=0 . . . N−1), N times.

First, at step S401, the difference between the X-coordinates of the points Ps and Pe and that between the Y-coordinates of the points Ps and Pe are respectively obtained from:

$$dx=xe-xs, \ dy=ye-ys$$

The process proceeds to step S402, at which whether or not ABS(dx)≧ABS(dy) and dx≧0 holds is determined. If YES, the process proceeds to step S403, at which a copy area SQ is specified as a rectangular area defined by a point (xs, y0) and a point (x1, y1). The copy-start point Q of the copy area SQ is specified by the coordinates (xs, y0); the number N of copy-end points is ABS(dx); and the movement-end point Qi is specified by the coordinates (xs+i, y0)(i=0 . . . N−1). To discriminate the expression for the respective points Qi, a discrimination flag F is set to "1". FIG. 6 shows the displayed character image data specified at step S403.

At step S402, if ABS(dx)≧ABS(dy) and dx≧0 does not hold, the process proceeds to step S404, at which whether or not ABS(dx)≧ABS(dy) and dx<0 holds is determined. If YES, the process proceeds to step S405, at which the copy area SQ is specified as a rectangular area defined by a point (xs, y0) and a point (xs, y1). The copy-start point Q of the copy area SQ is specified by the coordinates (xs, y0); the number N of the copy-end points, ABS(dx); and the respective copy-end points Qi, (xs−i, y0) (i=0 . . . N−1). To discriminate the expression for the respective points Qi, a discrimination flag F is set to "2". FIG. 8 shows the displayed character image data specified at step S405.

At step S404, if ABS(dx)≧ABS(dy) and dx<0 does not hold, the process proceeds to step S406, at which whether or not ABS(dx)<ABS(dy) and dy≧0 holds is determined. If YES, the process proceeds to step S407, at which the copy area SQ is specified as a rectangular area defined by a point (x0, ys) and a point (x1, ys). The copy-start point Q of the copy area SQ is specified by the coordinates (x0, ys); the number N of the copy-end points, ABS(dy); and the respective copy-end points Qi, (x0, ys+1)(i=0 . . . N−1). To discriminate the expression for the respective points Qi, a discrimination flag F is set to "3". FIG. 10 shows the displayed character image data specified at step S407.

At step S406, if ABS(dx)<ABS(dy) and dy≧0 does not hold, the process proceeds to step S408, at which the copy area SQ is specified as a rectangular area defined by a point (x0, ys) and a point (x1, ys). The copy-start point Q of the copy area SQ is specified by the coordinates (x0, ys); the number N of the copy-end points, ABS(dy); and the respective copy-end points Qi, (x0, ys−i)(i=0 . . . N−1). To discriminate the expression for the respective points Qi, a discrimination flag F is set to "4". FIG. 12 shows the displayed character image data specified at step S408.

Figure 4:
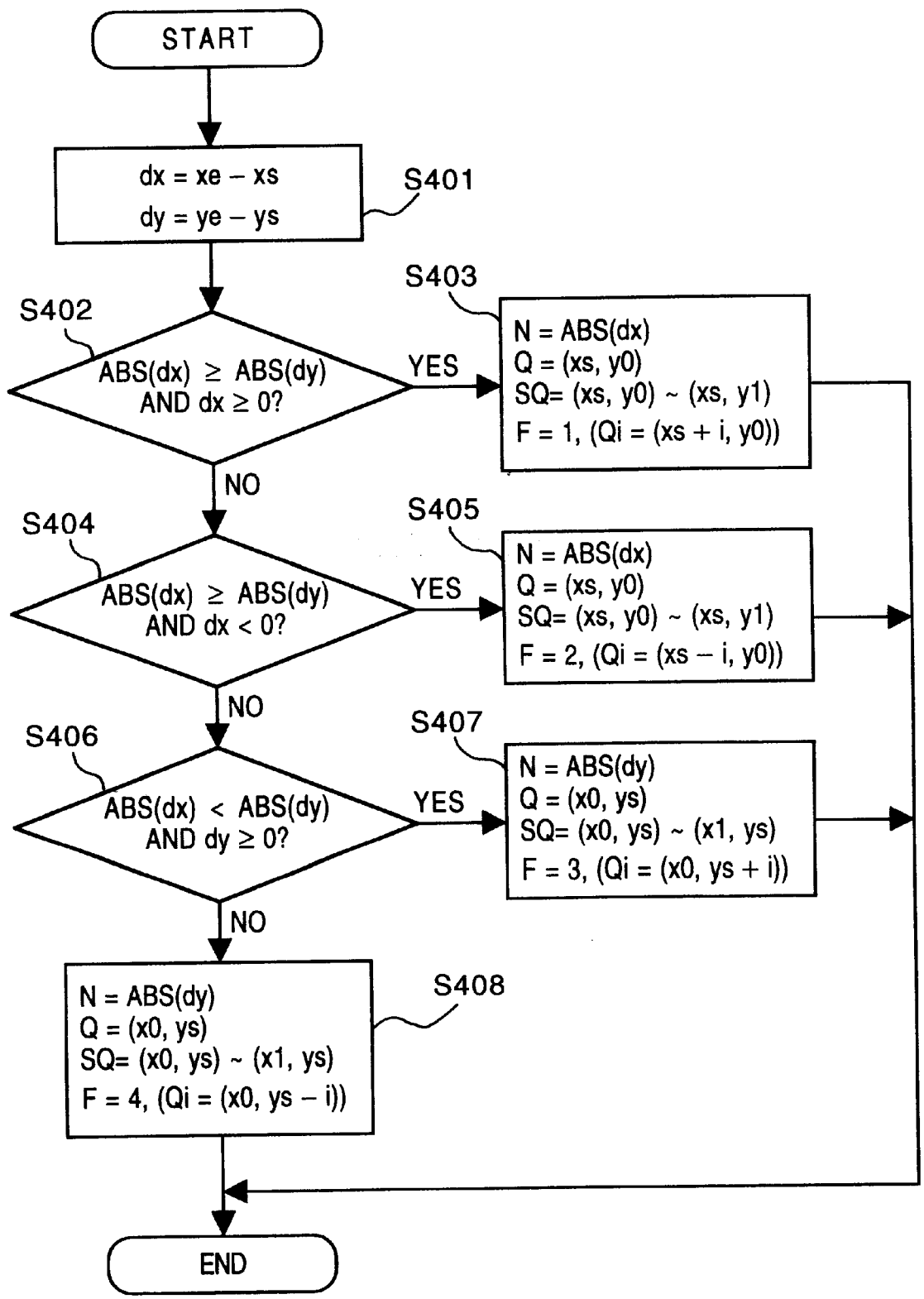
FIG. 4 is a flowchart showing processing to designate an area to be copied and a copy destination according to the first embodiment.

Note that steps S401, S402, S404 and S406 in FIG. 4 are identical to steps S301, S302, S304 and S306 in FIG. 3, therefore, steps S403, S405, S407 and S408 in FIG. 4 may be performed after steps S303, S305, S307 and S308 in FIG. 3.

The number of possible combinations of movement areas designated at steps S303, 305, 307 and 308 and movement destinations designated at steps S403, S405, S407 and S408 is four.

Figure 5:
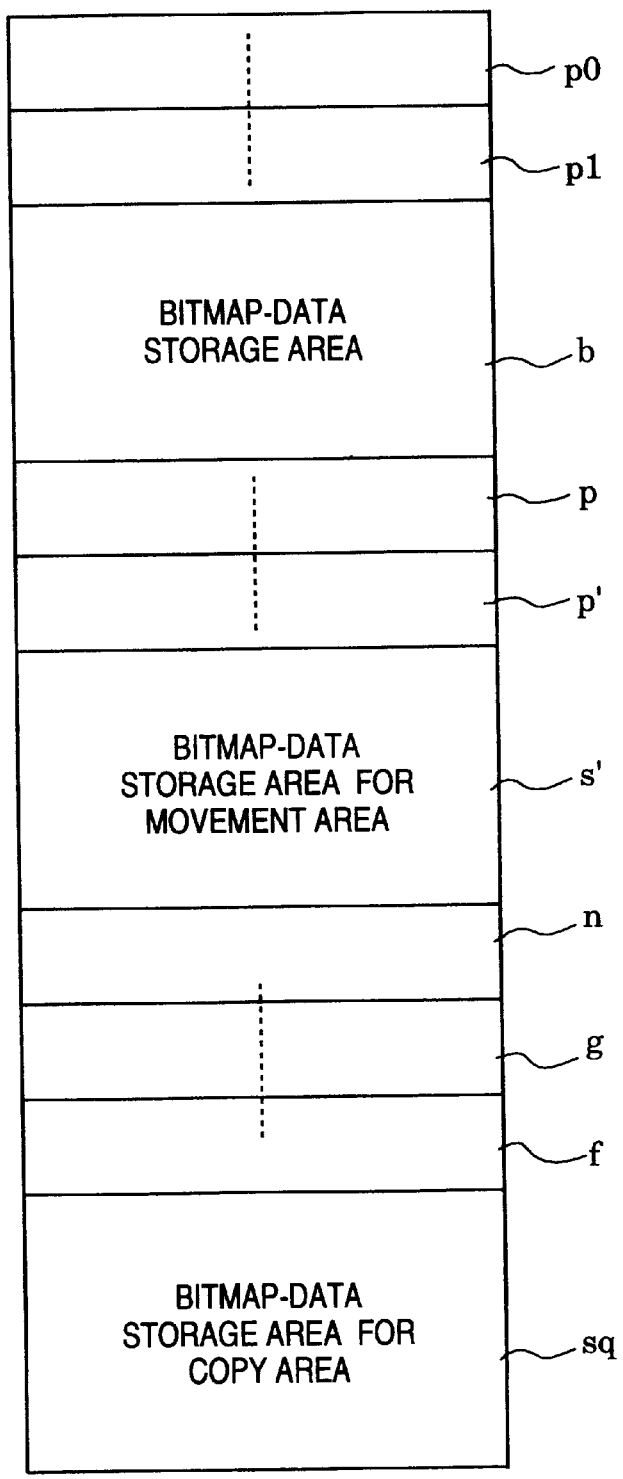
FIG. 5 is a schematic view showing a bitmap table for storing data for the editing processing of the first embodiment.

FIG. 5 shows a bitmap table for storing coordinate values of the edit area, a bitmap pattern as the character image in the edit area, the coordinate values of the movement-start and movement-end points and the bitmap pattern in the movement area designated at step S203, the coordinate values of the copy-start and copy-end points and the bitmap pattern in the copy area designated at step S204. The bitmap pattern table is stored in the program memory 9 of the control unit 2.

In FIG. 5, storage areas p0, p1 contain the coordinate values of the points P0 and P1, and a storage area b contains the bitmap pattern in the edit area.

Note that though not described at step S203 in FIG. 2, the coordinate values of the copy-start and copy-end points P and P' are stored in the storage areas p and p', and the bitmap pattern of the movement area S is stored in the storage area s'.

Further, though not described at step S204 in FIG. 2, the coordinate values of the copy-start point Q, the number of copy-end points N, the copy-end points Qi(i=0 . . . N−1) and the value of the flag F to discriminate the expression Qi(i=0 . . . N−1) for the respective copy-end points Qi are stored in the storage areas q, n and f. The bitmap pattern of the copy area SQ is stored in the storage area sq.

Next, processing to move the designated movement area performed at step S205 will be described.

First, the bitmap data of the movement area S stored in the storage area s' is overlaid on the movement-start point P stored in the storage area p, and overlaid by exclusive logical OR (XOR) the bitmap data stored in the storage area b. This clears the pattern in the movement area S of the bitmap data stored in the storage area b. Next, the position of the movement area S is shifted so that the movement-end point P' stored in the storage area p' becomes a new base point, where the logical product (AND) of the movement area S and the edit area is calculated to determine an overlapped area. Then, the bitmap data in the storage area b is copied on the bitmap data stored in the storage area b.

Thus, the movement area S can be moved to the desired position.

Next, processing to copy the copy area performed at step S206 will be described.

First, the bitmap data of the copy area SQ stored in the storage area sq is overlaid on the respective copy-end points Qi (i=0 . . . N−1) obtained by the flag F values to discriminate the expressions Qi (i=0 . . . N−1), stored in the storage area f, and by the number N of the copy-end points stored in the storage area n, by copying (COPY). That is, if the flag F value is "1", the coordinate values of the respective copy-end points Qi are obtained by (xs+1, y0)(i=0 . . . N−1). Then, with the coordinates (xs, y0) of the copy-end point Q0 when i=0 holds, the bitmap data of the copy area SQ is overlaid on the bitmap data stored in the storage area b, by copying, so that the copy-start point Q corresponds with the copy-end point Q0. Then, with the coordinates (xs+1, y0) of the copy-end point Q1 when i=1 holds, the bitmap data of the copy area SQ is overlaid on the bitmap data stored in the storage area b, by copying, so that the copy-start point Q corresponds with the copy-end point Q1. In this manner, the copying operation is repeated N times until coefficient i becomes N−1. Note that if N=0 holds, the copying is not performed.

If the flag F value is "2", the coordinate values of the respective copy-end points Qi are obtained by (xs−i, y0)(i=0 . . . N−1). Then, with the coordinates (xs, y0) of the copy-end point Q0 when i=0 holds, the bitmap data of the copy area SQ is overlaid on the bitmap data stored in the storage area b, by copying, so that the copy-start point Q corresponds with the copy-end point Q0. Then, with the coordinates (xs−1, y0) of the copy-end point Q1 when i=1 holds, the bitmap data of the copy area SQ is overlaid on the bitmap data stored in the storage area b, by copying, so that the copy-start point Q corresponds with the copy-end point Q1. In this manner, the copying operation is repeated N times until coefficient i becomes N−1. Note that if N=0 holds, the copying is not performed.

If the flag F value is "3", the coordinate values of the respective copy-end points Qi are obtained by (x0, ys+i)(i=0 . . . N−1). If the flag F value is "4", the coordinate values of the respective copy-end points Qi are obtained by (x0, ys−i)(i=0 . . . N−1). In these cases, overlaying as described above is performed. This copies the copy area at a desired position, and with the movement processing, attains desired deformation.

Figure 7:
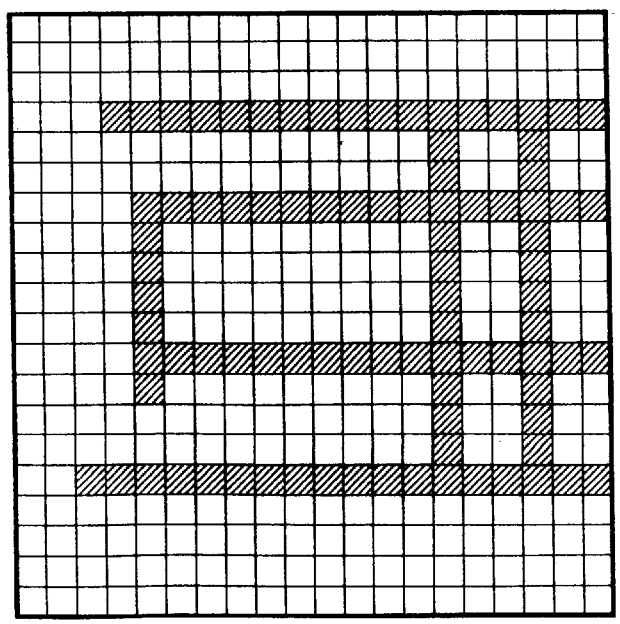
FIG. 7 is an example of edited image data deformed from the character image data in FIG. 6.

FIG. 7 shows the edited character image part, resulted from movement of the movement area S and copying of the copy area SQ shown in FIG. 6, in accordance with the values determined at step S303 in FIG. 3 and S403 in FIG. 4.

Figure 9:
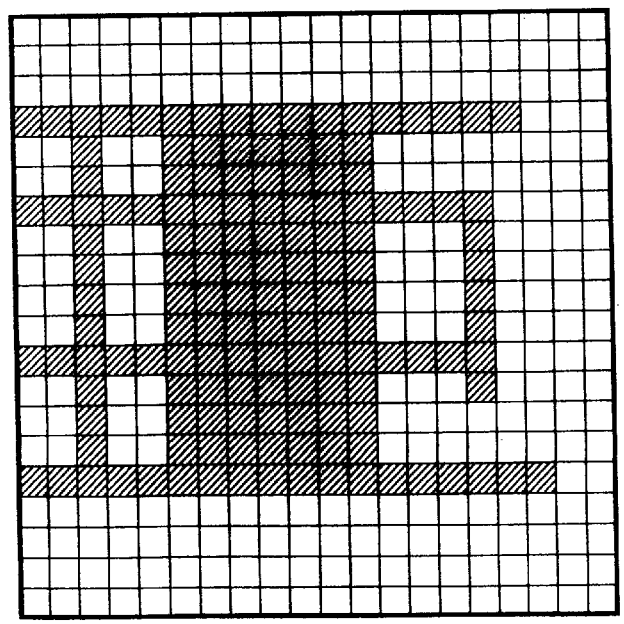
FIG. 9 is an example of edited image data deformed from the character image data in FIG. 8.

FIG. 9 shows the edited character image part, resulted from movement of the movement area S and copying of the copy area SQ shown in FIG. 8, in accordance with the values determined at step S305 in FIG. 3 and S405 in FIG. 4.

Figure 11:
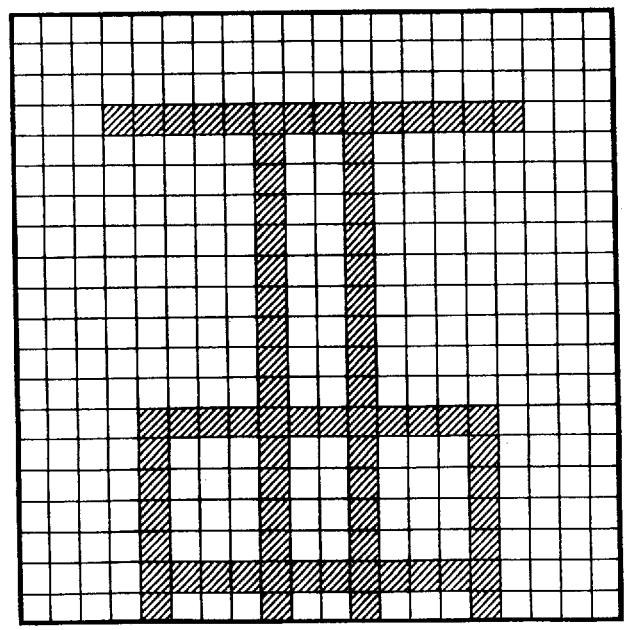
FIG. 11 is an example of edited image data deformed from the character image data in FIG. 10.

FIG. 11 shows the edited character image part, resulted from movement of the movement area S and copying of the copy area SQ shown in FIG. 10, in accordance with the values determined at step S307 in FIG. 3 and S407 in FIG. 4.

Figure 13:
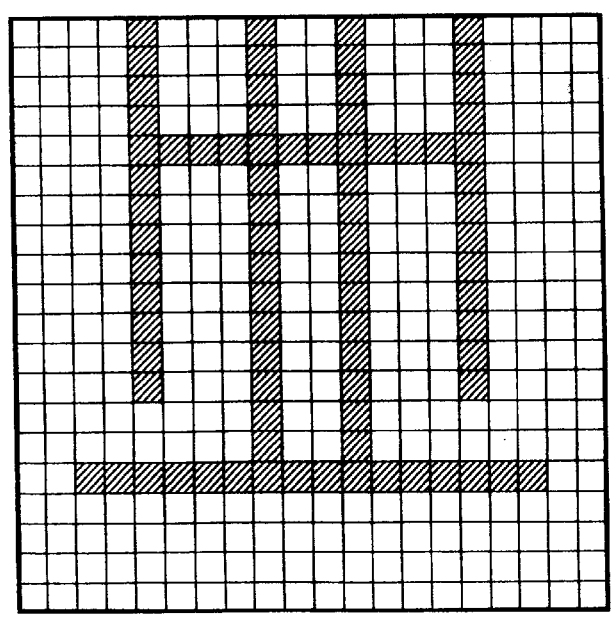
FIG. 13 is an example of edited image data deformed from the character image data in FIG. 12.

FIG. 13 shows the edited character image part, resulted from movement of the movement area S and copying of the copy area SQ shown in FIG. 12, in accordance with the values determined at step S308 in FIG. 3 and S408 in FIG. 4.

Second Embodiment

Next, a second embodiment of the present invention will be described with reference to FIGS. 14 to 22.

In the second embodiment, the editing is also made on rectangular edit area (cell of a matrix bitmap data) base, by merely designating two points (start point and end point) of the edit area as the objects of the editing. If the rectangular edit area is long in the row-direction (length<width), the entire column of the edit area including the start point is moved toward the end point, and the column adjacent to and outside of the column including the start point, is copied in the vacant column(s) inserted between the start point and the end point, as a result of movement, thus filling the inserted column(s) with data. On the other hand, if the rectangular edit area is long in the column-direction (length>width), the entire row of the edit area including the start point is moved toward the end point, and the column adjacent to the row including the start point, opposite to the movement direction, is copied in the vacant row(s) inserted between the start point and the end point, as a result of movement, thus filling the inserted row(s) with data.

Figure 14:
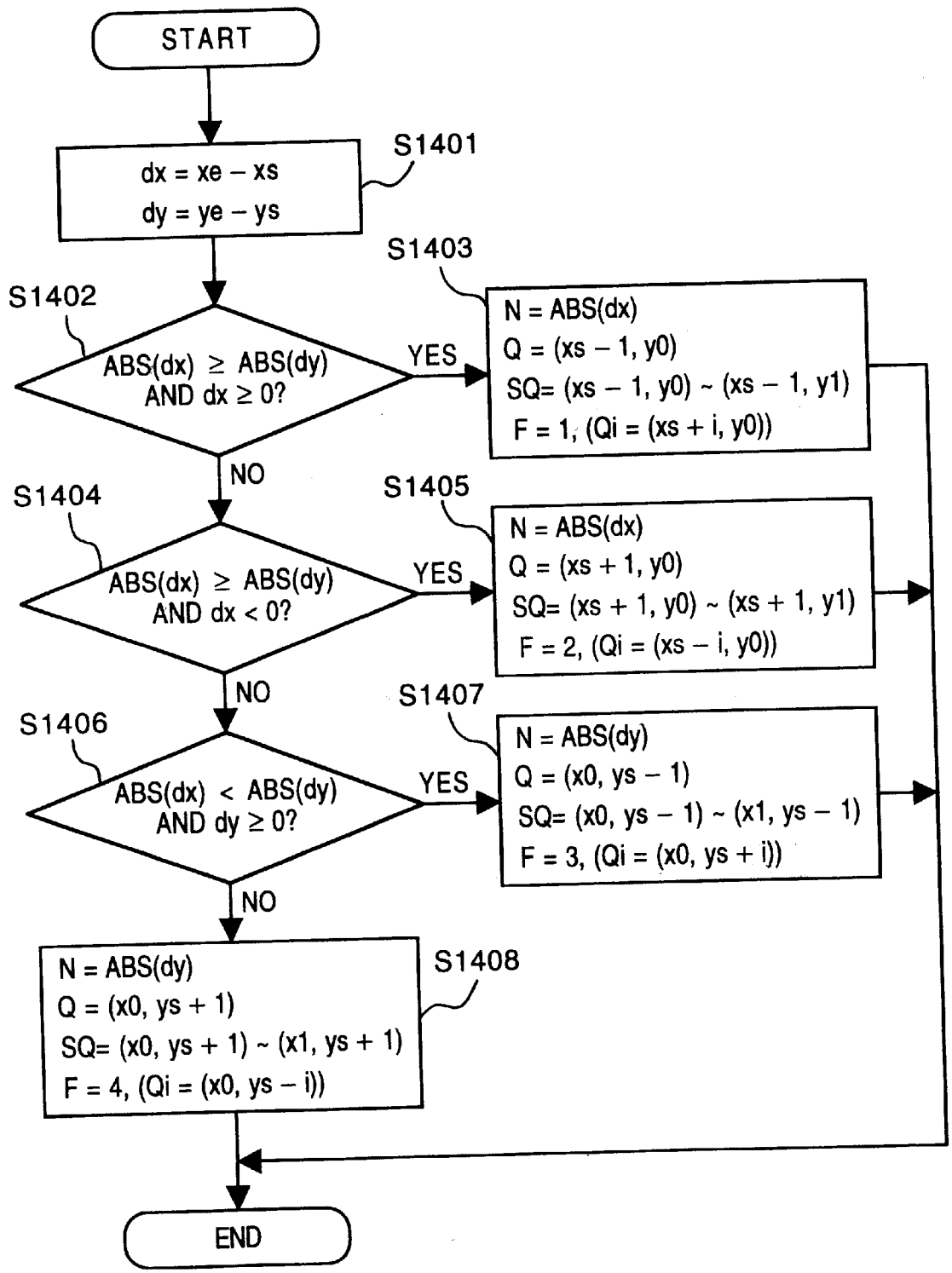
FIG. 14 is a flowchart showing processing to designate an area to be copied and a copy destination according to a second embodiment.

The difference from the first embodiment is designation of an area to be copied, executed at steps S1403, S1405, S1407 and S1408 in FIG. 14. Accordingly, steps S1403, S1405, S1407 and S1408 will be described in accordance with FIGS. 14 to 22, but explanations of the other steps will be omitted.

FIG. 14 is a flowchart showing the copying processing by the image processing apparatus according to the second embodiment. A control program for execution of this processing is stored in the program memory 9 of the control unit 2.

The editing starts in a state where an area to be edited is displayed on the display unit 3 with an image as the object of the editing.

FIGS. 15, 17, 19 and 21 respectively show character image data in an edit area displayed on the display unit 3. In these figures, a point P0 is a upper left point of the edit area; P1, a lower right point of the edit area; Ps, the edit-start point designated at step S201 in FIG. 2; and Pe, the edit-end point designated at step S202 in FIG. 2.

First, at step S1401, the difference between the X-coordinates of the points Ps and Pe and that between the Y-coordinates of the points Ps and Pe are respectively obtained from:

$$dx = xe - xs, \quad dy = ye - ys$$

The process proceeds to step S1402, at which whether or not ABS(dx)≧ABS(dy) and dx≧0 holds is determined. If YES, the process proceeds to step S1403, at which a copy area SQ is specified as one-column rectangular area defined by a point (xs−1, y0) and a point (xs−1, y1). The copy-start point Q of the copy area SQ is specified by the coordinates (xs−1, y0); the number N of copy-end points is ABS(dx); and the movement-end point Qi is specified by the coordinates (xs+i, y0)(i=0 . . . N−1). To discriminate the expression for the respective points Qi, a discrimination flag F is set to "1".

At step S1403, whether or not xs=x0 holds is determined, and if YES, the number N of copy-end points may be set to "0", and the copy area SQ coordinates may be set to "NULL".

Figure 15:
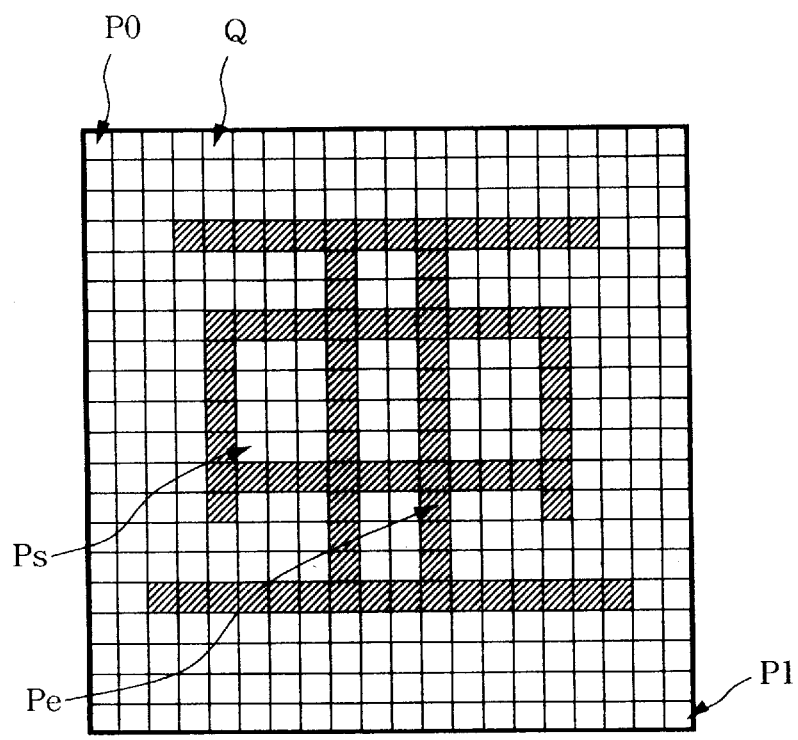
FIG. 15 is an example of character image data as an edit area with points necessary for the editing processing according to the second embodiment.

FIG. 15 shows the displayed character image data designated at step S1403.

At step S1402, if ABS(dx)≧ABS(dy) and dx≧0 does not hold, the process proceeds to step S1404, at which whether or not ABS(dx)≧ABS(dy) and dx<0 holds is determined. If YES, the process proceeds to step S1405, at which the copy area SQ is specified as one-column rectangular area defined by a point (xs+1, y0) and a point (xs+1, y1). The copy-start point Q of the copy area SQ is specified by the coordinates (xs+1, y0); the number N of the copy-end points, ABS(dx); and the respective copy-end points Qi, (xs−i, y0)(i=0 . . . N−1. To discriminate the expression for the respective points Qi, a discrimination flag F is set to "2".

At step S1405, whether or not xs=x1 holds is determined, and if YES, the number N of copy-end points may be set to "0", and the copy area SQ coordinates may be set to "NULL".

Figure 17:
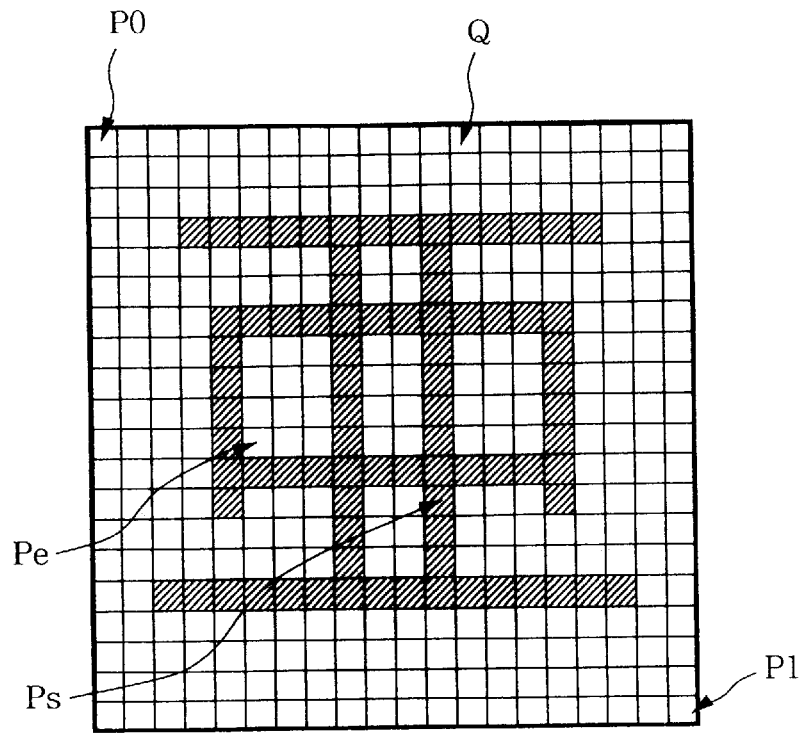
FIG. 17 is another example of character image data as an edit area with points necessary for the editing processing according to the second embodiment.

FIG. 17 shows the displayed character image data specified at step S1405.

At step S1404, if ABS(dx)≧ABS(dy) and dx<0 does not hold, the process proceeds to step S1406, at which whether or not ABS(dx)<ABS(dy) and dy≧0 holds is determined. If YES, the process proceeds to step S1407, at which the copy area SQ is specified as one-row rectangular area defined by a point (x0, ys−1) and a point (x1, ys−1). The copy-start point Q of the copy area SQ is specified by the coordinates (x0, ys−1); the number N of the copy-end points, ABS(dy); and the respective copy-end points Qi, (x0, ys+i)(i=0 . . . N−1). To discriminate the expression for the respective points Qi, a discrimination flag F is set to "3".

At step S1407, whether or not xs=y0 holds is determined, and if YES, the number N of copy-end points may be set to "0", and the copy area SQ coordinates may be set to "NULL".

Figure 19:
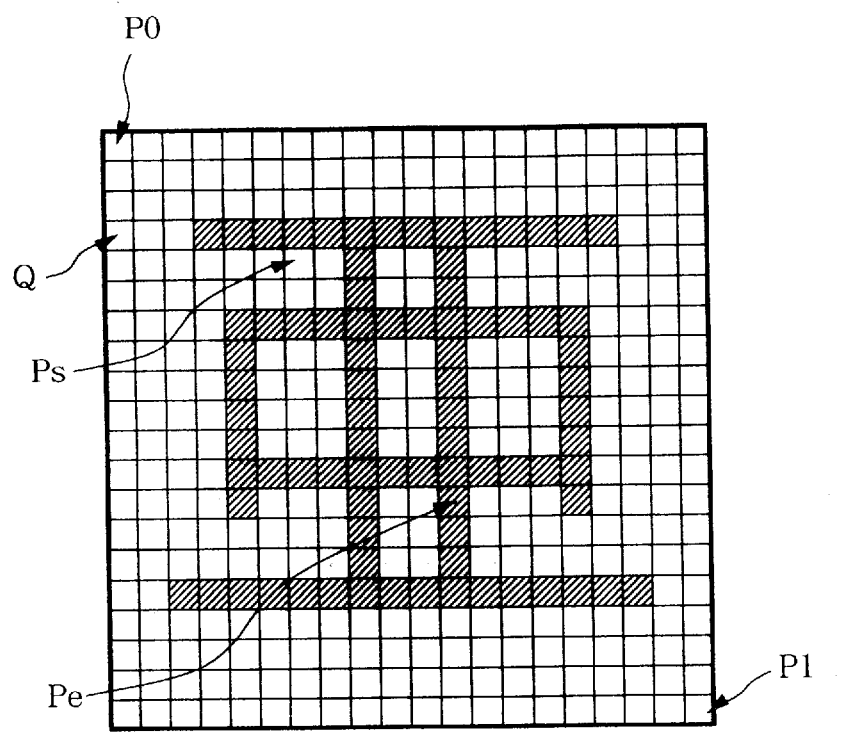
FIG. 19 is another example of character image data as an edit area with points necessary for the editing processing according to the second embodiment.

FIG. 19 shows the displayed character image data specified at step S1407.

At step S1406, if ABS(dx)<ABS(dy) and dy≧0 does not hold, the process proceeds to step S1408, at which the copy area SQ is specified as one-row rectangular area defined by a point (x0, ys+1) and a point (x1, ys+1). The copy-start point Q of the copy area SQ is specified by the coordinates (x0, ys+1); the number N of the copy-end points, ABS(dy); and the respective copy-end points Qi, (x0, ys−i)(i=0 . . . N−1). To discriminate the expression for the respective points Qi, a discrimination flag F is set to "4".

At step S1408, whether or not ys=y1 holds is determined, and if YES, the number N of copy-end points may be set to "0", and the copy area SQ coordinates may be set to "NULL".

Figure 21:
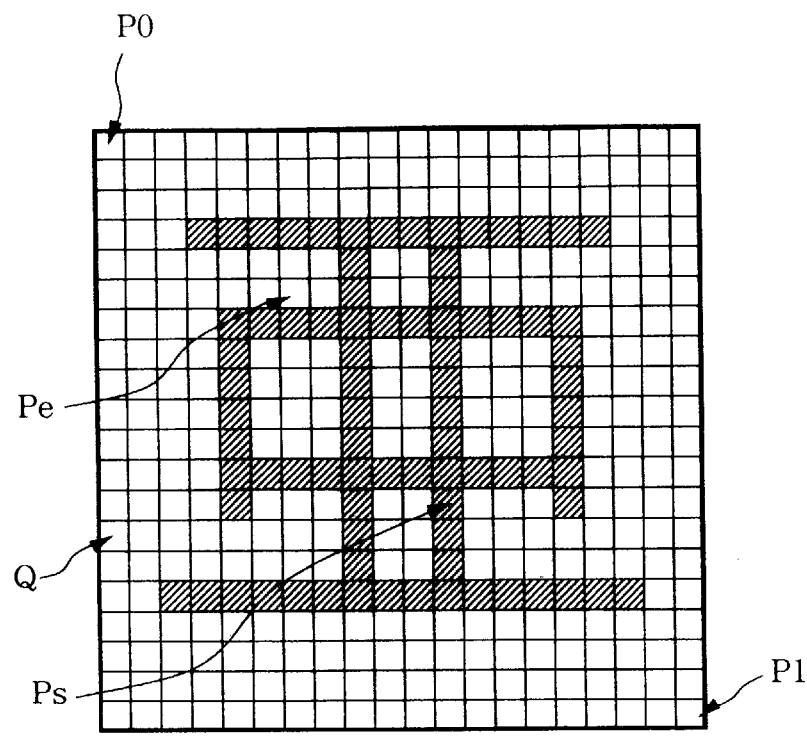
FIG. 21 is another example of character image data as an edit area with points necessary for the editing processing according to the second embodiment.

FIG. 21 shows the displayed character image data specified at step S1408.

Note that steps S1401, S1402, S1404 and S1406 in FIG. 14 are identical to steps S301, S302, S304 and S306 in FIG. 3, therefore, steps S1403, S1405, S1407 and S1408 may be performed after steps S303, S305, S307 and S308 in FIG. 3.

The number of possible combinations of movement areas specified at steps S303, 305, 307 and 308 and movement destinations specified at steps S1403, S1405, S1407 and S1408 is four.

Figure 16:
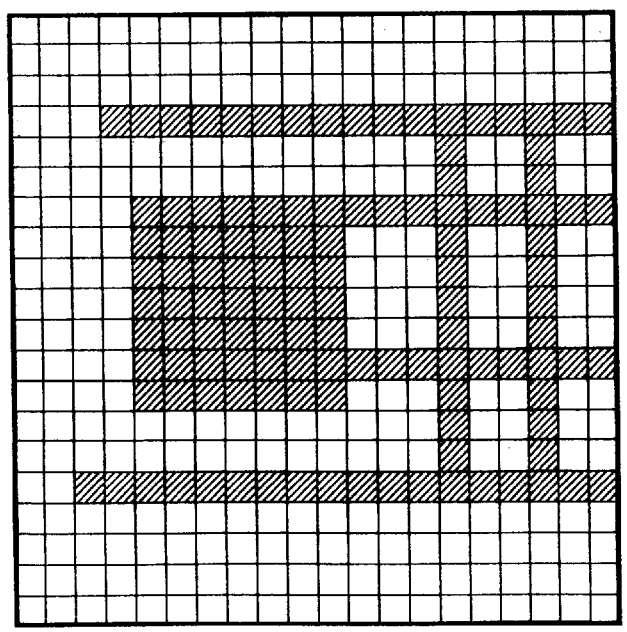
FIG. 16 is an example of edited image data deformed from the character image data in FIG. 15.

FIG. 16 shows the edited character image part, resulted from movement of the movement area S and copying of the copy area SQ shown in FIG. 15, in accordance with the values determined at step S303 in FIG. 3 and S1403 in FIG. 14.

Figure 18:
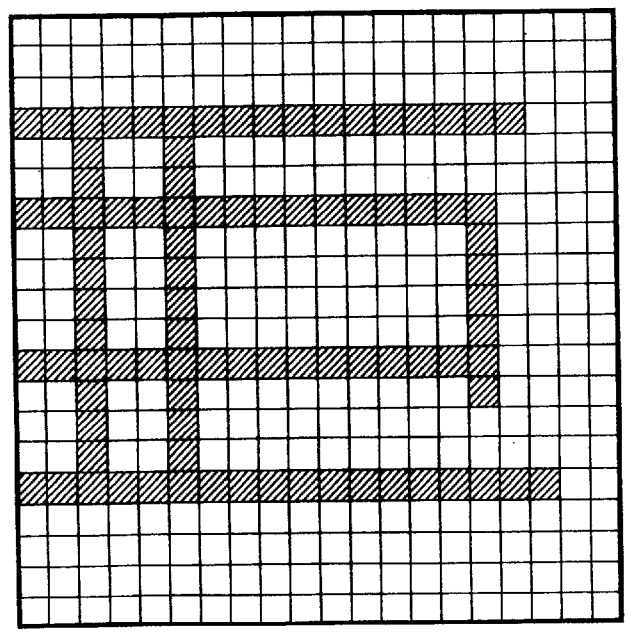
FIG. 18 is an example of edited image data deformed from the character image data in FIG. 17.

FIG. 18 shows the edited character image part, resulted from movement of the movement area S and copying of the copy area SQ shown in FIG. 17, in accordance with the values determined at step S305 in FIG. 3 and S1405 in FIG. 14.

Figure 20:
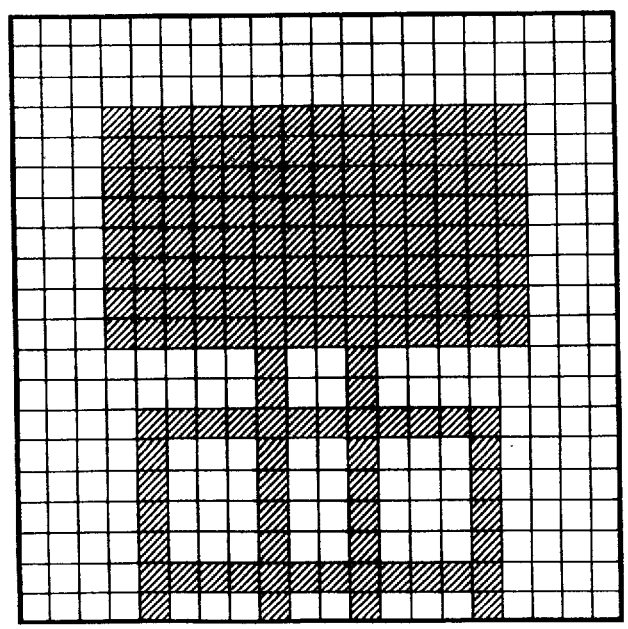
FIG. 20 is an example of edited image data deformed from the character image data in FIG. 19.

FIG. 20 shows the edited character image part, resulted from movement of the movement area S and copying of the copy area SQ shown in FIG. 19, in accordance with the values determined at step S307 in FIG. 3 and S1407 in FIG. 14.

Figure 22:
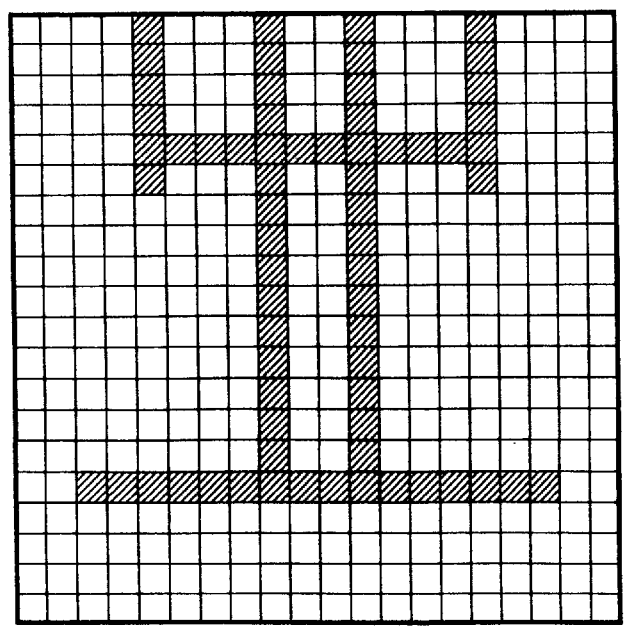
FIG. 22 is an example of edited image data deformed from the character image data in FIG. 21.

FIG. 22 shows the edited character image part, resulted from movement of the movement area S and copying of the copy area SQ shown in FIG. 21, in accordance with the values determined at step S308 in FIG. 3 and S1408 in FIG. 14.

Third Embodiment

Next, a third embodiment of the present invention will be described with reference to FIGS. 23 to 31.

Note that the construction and editing processing of the image processing apparatus according to the third embodiment is basically identical to the first embodiment as shown in FIGS. 1 and 2. Therefore, the explanation of this embodiment will be made using these figures.

In the third embodiment, the editing is made on rectangular edit area (cell of a matrix bitmap data) base, by merely designating two points (start point and end point) of the edit area as the objects of the editing. If the rectangular edit area is long in the row-direction (length<width), the entire column of the edit area including the start point is moved toward the end point, a logical product (AND) of the row including the start point and the column adjacent to and outside of the column including the start point is obtained, and the obtained column pattern is copied in the vacant column(s) inserted between the start point and the end point, as a result of movement, thus filling the inserted column(s) with data. On the other hand, if the rectangular edit area is long in the column-direction (length>width), the entire row of the edit area including the start point is moved toward the end point, and a logical product (AND) of the row including the start point and the row adjacent to and outside of the row including is copied in the vacant row(s) inserted between the start point and the end point, as a result of movement, thus filling the inserted row(s) with data.

Figure 23:
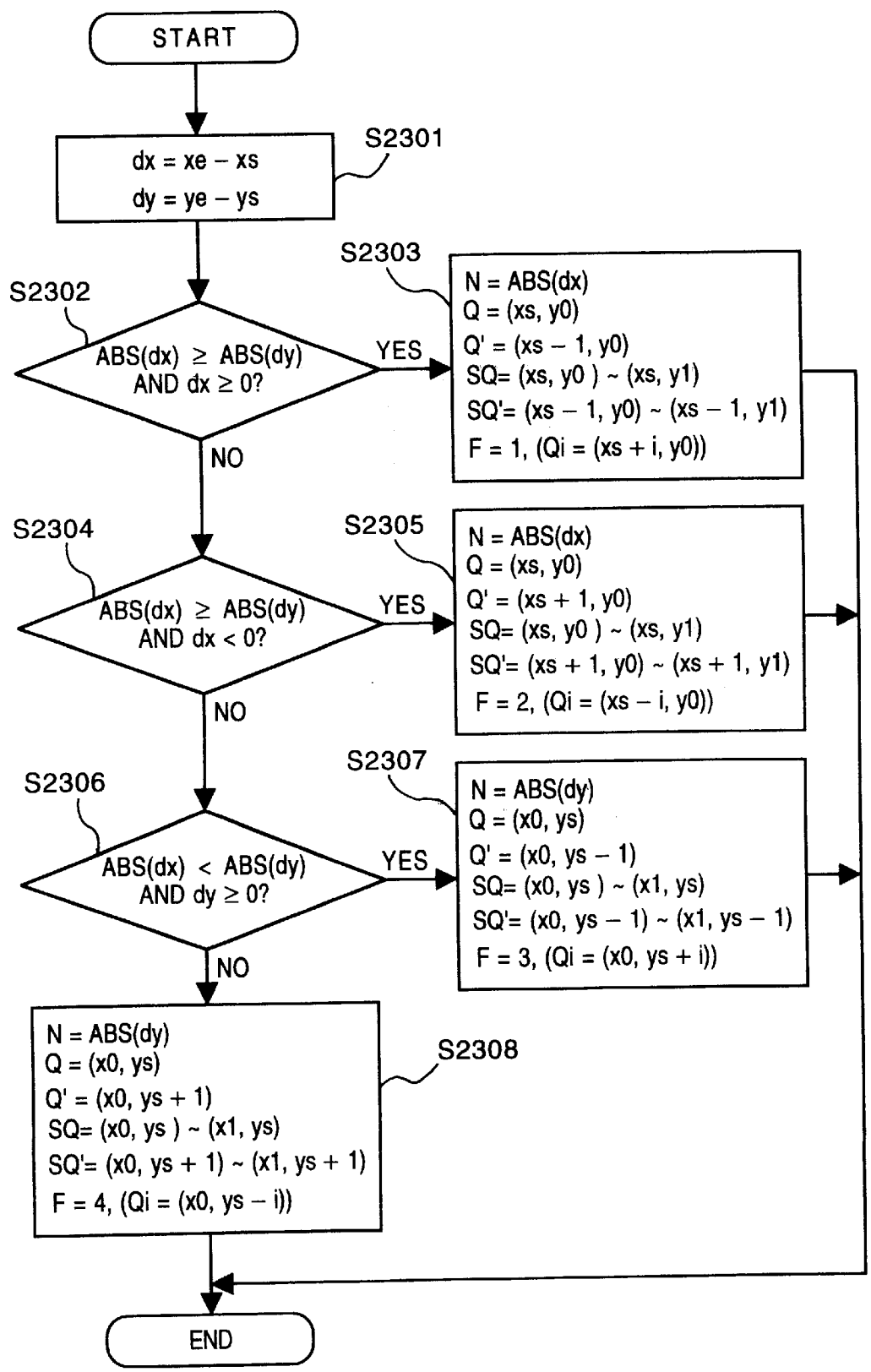
FIG. 23 is a flowchart showing processing to designate an area to be copied and a copy destination according to a third embodiment.

The difference from the first embodiment is designation of an area to be copied, executed at steps S2303, S2305, S2307 and S2308 in FIG. 23. Accordingly, steps S2303, S2305, S2307 and S2308 will be described in accordance with FIGS. 23 to 41, but explanations of the other steps will be omitted.

FIG. 23 is a flowchart showing the copying processing by the image processing apparatus according to the third embodiment. A control program for execution of this processing is stored in the program memory 9 of the control unit 2.

The editing starts in a state where an area to be edited is displayed on the display unit 3 with an image as the object of the editing.

FIGS. 24, 26, 28 and 30 respectively show character image data in an edit area displayed on the display unit 3. In these figures, a point P0 is a upper left point of the edit area; P1, a lower right point of the edit area; Ps, the edit-start point designated at step S201 in FIG. 2; and Pe, the edit-end point designated at step S202 in FIG. 2.

First, at step S2301, the difference between the X-coordinates of the points Ps and Pe and that between the Y-coordinates of the points Ps and Pe are respectively obtained from:

$$dx=xe-xs,\ dy=ye-ys$$

The process proceeds to step S2302, at which whether or not ABS(dx)≧ABS(dy) and dx≧0 holds is determined. If YES, the process proceeds to step S2303, at which a copy area SQ is specified as one-column rectangular area defined by a point (xs, y0) and a point (xs, y1), and the values are stored in the bitmap-data storage area sq in FIG. 5. Then, the copy-start point Q of the copy area SQ is specified by the coordinates (xs, y0) and the value is stored in the storage area q. Further, another copy area SQ' adjacent to and outside of the copy area SQ is specified by a point (xs−1, y0) and a point (xs−1, y1), and the values are stored in the storage area sq in FIG. 5. Then, the copy-start point Q' of the copy area SQ' is specified by the coordinates (xs−1, y0). The pattern data of the copy area SQ' is overlaid on the pattern data of the copy area SQ such that the point Q corresponds with the point Q', by logical AND operation. This obtains a pattern by a logical product of the pattern of the copy area SQ and that of the copy area SQ'. Further, the copy area SQ the number N of copy-end points is ABS(dx); and the movement-end point Qi is specified by the coordinates (xs+i, y0)(i=0 ... N−1). To discriminate the expression for the respective points Qi, a discrimination flag F is set to "1".

At step S2303, whether or not xs=x0 holds is determined, and if YES, the number N of copy-end points may be set to "0", and the copy area SQ coordinates may be set to "NULL".

Figure 24:
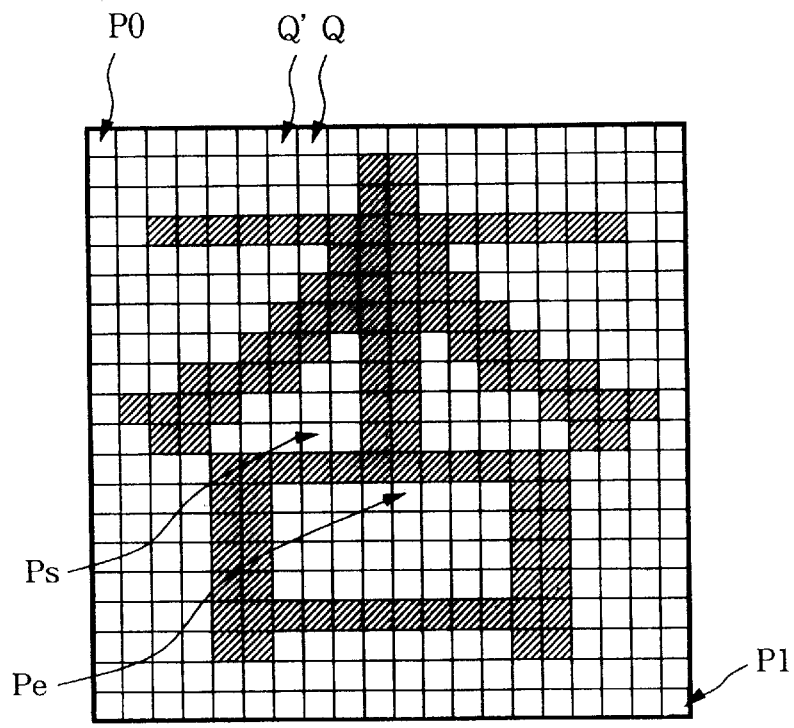
FIG. 24 is an example of character image data as an edit area with points necessary for the editing processing according to the third embodiment.

FIG. 24 shows the displayed character image data designated at step S2303.

At step S2302, if ABS(dx)≧ABS(dy) and dx≧0 does not hold, the process proceeds to step S2304, at which whether or not ABS(dx)≧ABS(dy) and dx<0 holds is determined. If YES, the process proceeds to step S2305, at which the copy area SQ is specified as one-column rectangular area defined by a point (xs, y0) and a point (xs, y1), and the values are stored in the bitmap-data storage area sq in FIG. 5. Then, the copy-start point Q of the copy area SQ is specified by the coordinates (xs, y0), and the value is stored in the storage area q in FIG. 5. Further, the copy area SQ' adjacent to and outside of the copy area SQ is specified as one-column rectangular area defined by a point (xs+1, y0) and a point (xs+1, y1), and the copy-start point Q' of the copy area SQ' is specified by the coordinates (xs+1, y0). The pattern data of the copy area SQ' is overlaid on the pattern data of the copy area SQ such that the point Q corresponds with the point Q', by logical AND operation. This obtains a pattern by a logical product of the pattern of the copy area SQ and that of the copy area SQ'. This pattern is newly set as the copy area SQ.

Further, the number N of copy-end points is ABS(dx); and the movement-end point Qi is specified by the coordinates (xs−i, y0)(i=0 ... N−1). To discriminate the expression for the respective points Qi, a discrimination flag F is set to "2".

At step S2305, whether or not xs=x1 holds is determined, and if YES, the number N of copy-end points may be set to "0", and the copy area SQ coordinates may be set to "NULL".

Figure 26:
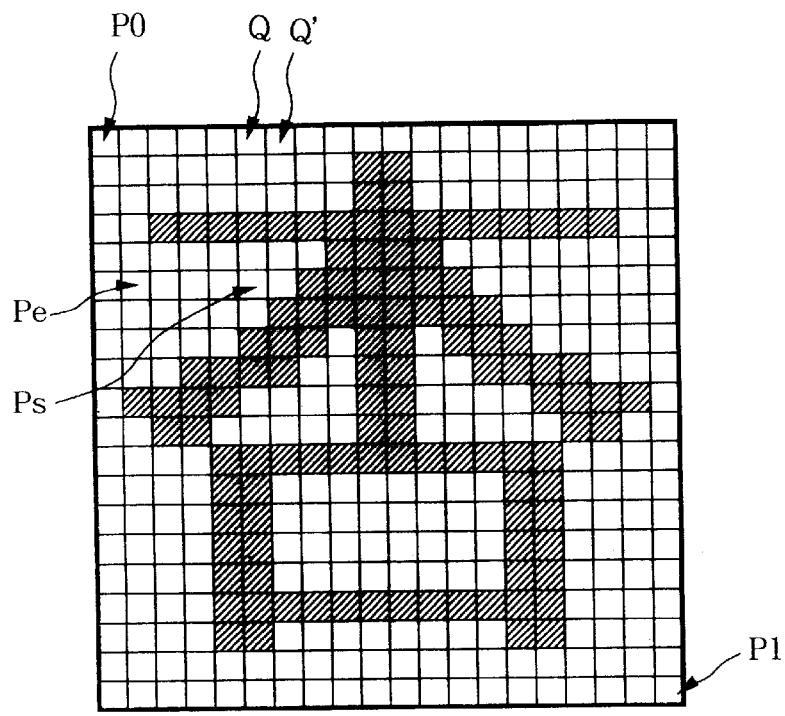
FIG. 26 is another example of character image data as an edit area with points necessary for the editing processing according to the third embodiment.

FIG. 26 shows the displayed character image data specified at step S2305.

At step S2304, if ABS(dx)≧ABS(dy) and dx<0 does not hold, the process proceeds to step S2306, at which whether or not ABS(dx)<ABS(dy) and dy≧0 holds is determined. If YES, the process proceeds to step S2307, at which the copy area SQ is specified as one-row rectangular area defined by a point (x0, ys) and a point (x1, ys), and the values are stored in the bitmap-data storage area sq in FIG. 5. Then, the copy-start point Q of the copy area SQ is specified by the coordinates (x0, ys), and the value is stored in the storage area q in FIG. 5. Further, the copy area SQ' adjacent to and outside of the copy area SQ is specified as one-row rectangular area defined by a point (x0, Ys−1) and a point (x1, ys−1), and the copy-start point Q' of the copy area SQ' is specified by the coordinates (x0, Ys-1). The pattern data of the copy area SQ' is overlaid on the pattern data of the copy area SQ such that the point Q corresponds with the point Q', by logical AND operation. This obtains a pattern by a logical product of the pattern of the copy area SQ and that of the copy area SQ'. This pattern is newly set as the copy area SQ.

Further, the number N of copy-end points is ABS(dy); and the movement-end point Qi is specified by the coordinates (x0, ys+i)(i=0 ... N−1). To discriminate the expression for the respective points Qi, a discrimination flag F is set to "3".

At step S2307, whether or not ys=y0 holds is determined, and if YES, the number N of copy-end points may be set to "0", and the copy area SQ coordinates may be set to "NULL".

Figure 28:
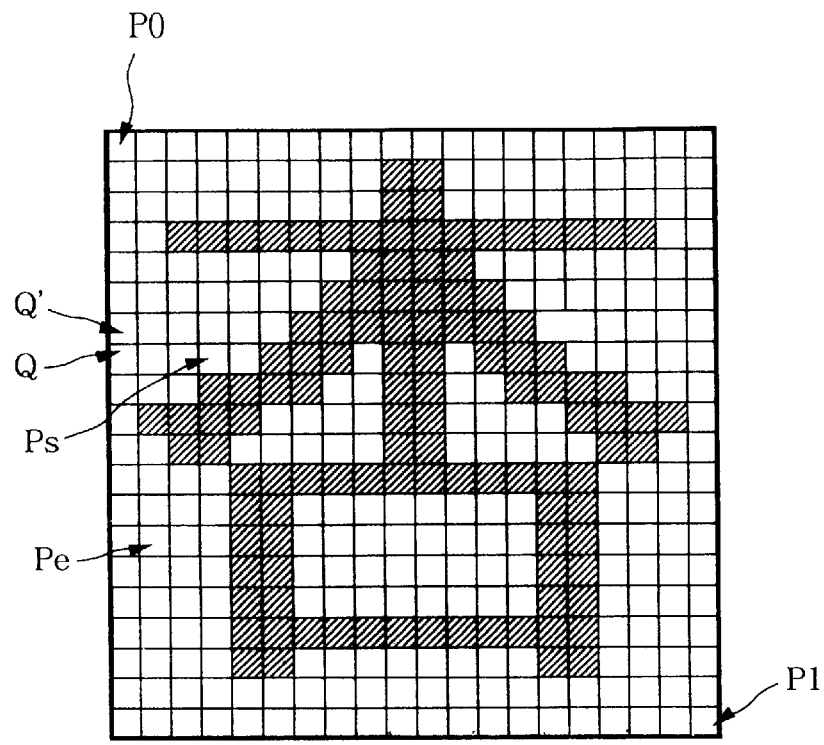
FIG. 28 is another example of character image data as an edit area with points necessary for the editing processing according to the third embodiment.

FIG. 28 shows the displayed character image data specified at step S2307.

At step S2306, if ABS(dx)<ABS(dy) and dy≧0 does not hold, the process proceeds to step S2308, at which the copy area SQ is specified as one-row rectangular area defined by a point (x0, ys) and a point (x1, ys), and the values are stored in the bitmap-data storage area sq in FIG. 5. Then, the copy-start point Q of the copy area SQ is specified by the coordinates (x0, ys), and the value is stored in the storage area q in FIG. 5. Further, the copy area SQ' adjacent to and outside of the copy area SQ is designated as one-row rectangular area defined by a point (x0, ys+1) and a point (x1, ys+1), and the copy-start point Q' of the copy area SQ' is specified by the coordinates (x0, ys+1). The pattern data of the copy area SQ' is overlaid on the pattern data of the copy area SQ such that the point Q corresponds with the point Q', by logical AND operation. This obtains a pattern by a logical product of the pattern of the copy area SQ and that of the copy area SQ'. This pattern is newly set as the copy area SQ.

Further, the number N of copy-end points is ABS(dy); and the movement-end point Qi is specified by the coordinates (x0, ys−i)(i=0 ... N−1). To discriminate the expression for the respective points Qi, a discrimination flag F is set to "4".

At step S2308, whether or not ys=y1 holds is determined, and if YES, the number N of copy-end points may be set to "0", and the copy area SQ coordinates may be set to "NULL".

Figure 30:
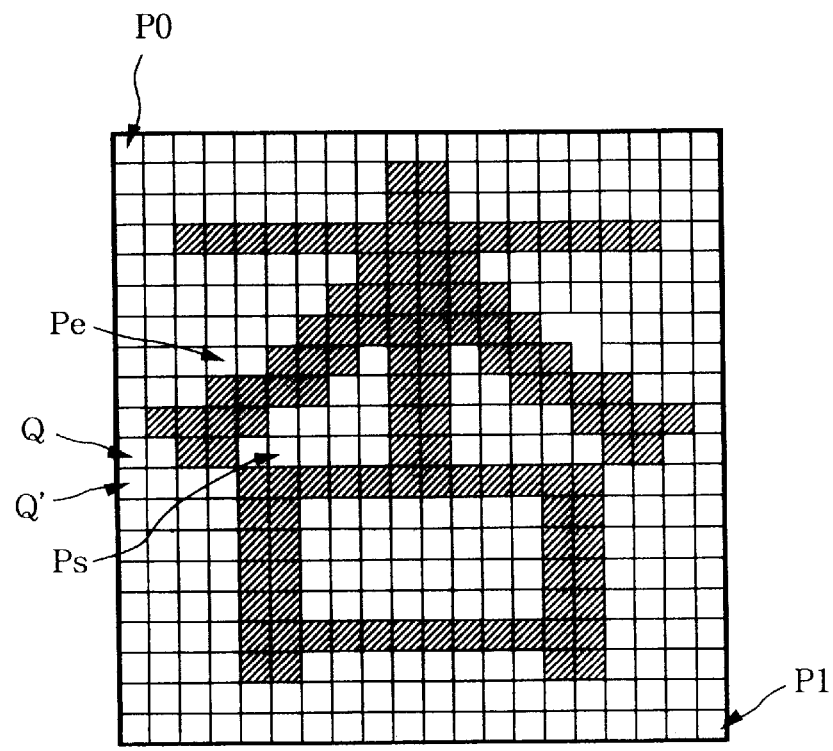
FIG. 30 is another example of character image data as an edit area with points necessary for the editing processing according to the third embodiment.

FIG. 30 shows the displayed character image data specified at step S2308.

Note that steps S2301, S2302, S2304 and S2306 in FIG. 23 are identical to steps S301, S302, S304 and S306 in FIG. 3, therefore, steps S2303, S2305, S2307 and S2308 may be performed after steps S303, S305, S307 and S308 in FIG. 3.

The number of possible combinations of movement areas specified at steps S303, S305, S307 and S308 and movement destinations specified at steps S2303, S2305, S2307 and S2308 is four.

Figure 25:
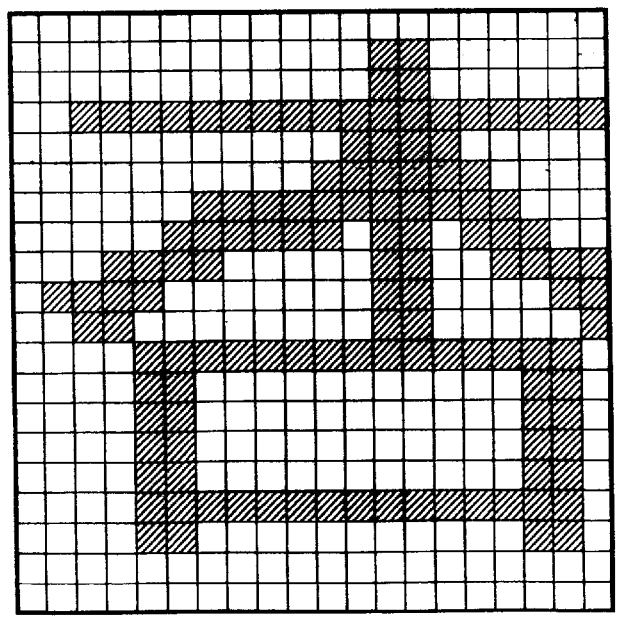
FIG. 25 is an example of edited image data deformed from the character image data in FIG. 24.

FIG. 25 shows the edited character image part, resulted from movement of the movement area S and copying of the copy area SQ shown in FIG. 24, in accordance with the values determined at step S303 in FIG. 3 and S2303 in FIG. 23.

Figure 27:
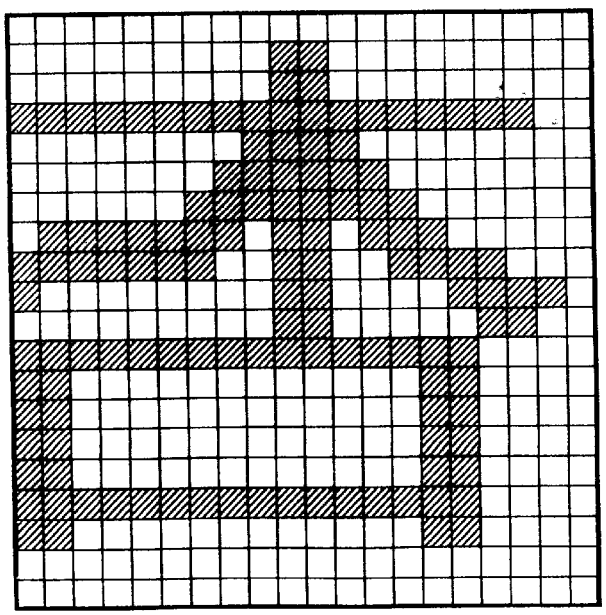
FIG. 27 is an example of edited image data deformed from the character image data in FIG. 26.

FIG. 27 shows the edited character image part, resulted from movement of the movement area S and copying of the copy area SQ shown in FIG. 26, in accordance with the values determined at step S305 in FIG. 3 and S2305 in FIG. 23.

Figure 29:
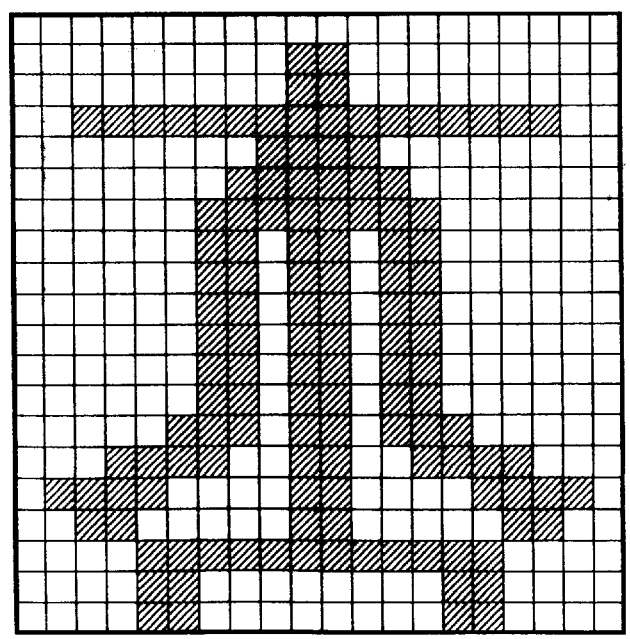
FIG. 29 is an example of edited image data deformed from the character image data in FIG. 28.

FIG. 29 shows the edited character image part, resulted from movement of the movement area S and copying of the copy area SQ shown in FIG. 28, in accordance with the values determined at step S307 in FIG. 3 and S2307 in FIG. 23.

Figure 31:
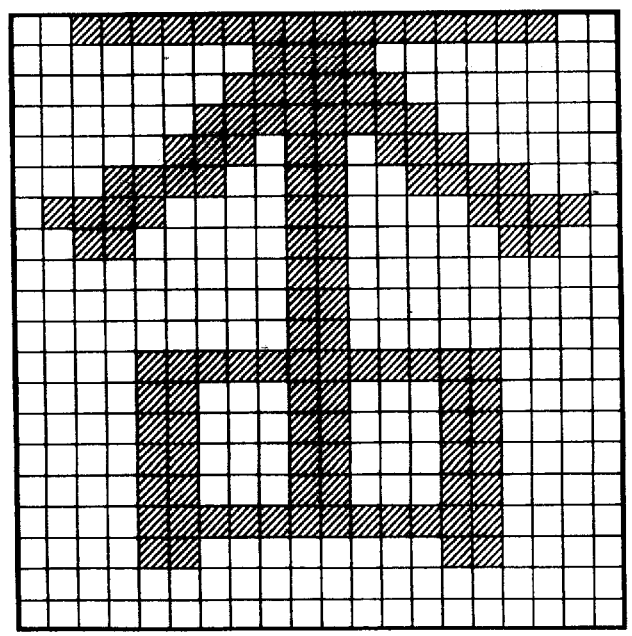
FIG. 31 is an example of edited image data deformed from the character image data in FIG. 30.

FIG. 31 shows the edited character image part, resulted from movement of the movement area S and copying of the copy area SQ shown in FIG. 30, in accordance with the values determined at step S308 in FIG. 3 and S2308 in FIG. 23.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:

a first designation step of designating an edit-start point on an edit area of a displayed image;

a second designation step of designating an edit-end point on the edit area;

a first specifying step of specifying a movement area to be moved and a movement destination;

a second specifying step of specifying a copy area to be copied and a copy destination;

a movement step of moving the movement area to the movement destination specified at said first specifying step; and a copying step of copying the copy area at the copy destination specified at said second specifying step, wherein if the rectangular edit area is longer in a row-direction than a column-direction, at said first designation step, the movement area is designated from a column including the edit-start point to a column including the edit-end point, and the column including the edit-end point is designated as the movement destination, and at said second designation step, the column including the edit-start point is designated as the copy area, and columns of the movement area excluding the movement destination are designated as the copy destinations, and wherein at said movement step, the movement area is moved, and at said copying step, the copy area is copied at the copy destinations.

2. The image processing method according to claim 1, wherein if the rectangular edit area is longer in a column-direction than in a row-direction, at said first specifying step, the movement area is designated from a row including the edit-start point to a row including the edit-end point, and the row including the edit-end point is designated as the movement destination, and at said second specifying step, the row including the edit-start point is designated as the copy area, and rows of the movement area excluding the movement destination are specified as the copy destinations, and wherein at said movement step, the movement area is moved, and at said copying step, the copy area is copied at the copy destinations.

3. An image processing method comprising:

a first designation step of designating an edit-start point on an edit area of a displayed image;

a second designation step of designating an edit-end point on the edit area;

a first specifying step of specifying a movement area to be moved and a movement destination;

a second specifying step of specifying a copy area to be copied and a copy destination;

a movement step of moving the movement area to the movement destination specified at said first specifying step; and a copying step of copying the copy area at the copy destination specified at said second specifying step, wherein if the rectangular edit area is longer in a row-direction than in a column-direction, at said first specifying step, the movement area is designated from a column including the edit-start point to a column including the edit-end point, and the column including the edit-end point is specified as the movement destination, and at said second specifying step, a column adjacent to the column including the edit-start point and opposite to the edit-end point is designated as the copy area, and columns of the movement area excluding the movement destination are specified as the copy destinations, and wherein at said movement step, the movement area is moved, and at said copying step, the copy area is copied at the copy destinations.

4. The image processing method according to claim 3, wherein if the rectangular edit area is longer in a column-direction than in a row-direction, at said first specifying step, the movement area is specified from a row including the edit-start point to a row including the edit-end point, and the row including the edit-end point is specified as the movement destination, and at said second specifying step, a row adjacent to the row including the edit-start point and opposite to the edit-end point is specified as the copy area, and rows of the movement area excluding the movement destination are specified as the copy destinations, and wherein at said movement step, the movement area is moved, and at said copying step, the copy area is copied at the copy destinations.

5. An image processing method comprising:

a first designation step of designating an edit-start point on an edit area of a displayed image;

a second designation step of designating an edit-end point on the edit area;

a first specifying step of specifying a movement area to be moved and a movement destination;

a second specifying step of specifying a copy area to be copied and a copy destination;

a movement step of moving the movement area to the movement destination specified at said first specifying step; and a copying step of copying the copy area at the copy destination specified at said second specifying step, wherein if the rectangular edit area is longer in a row-direction than in a column-direction, at said first specifying step, the movement area is specified from a column including the edit-start point to a column including the edit-end point, and the column including the edit-end point is specified as the movement destination, and at said second specifying step, the column including the edit-start point and a column adjacent to the column including the edit-start point and opposite to the edit-end point are specified as the copy area, and columns of the movement area excluding the movement destination are specified as the copy destinations, and wherein at said movement step, the movement area is moved, and at said copying step, the copy area is copied at the copy destinations.

6. The image processing method according to claim 5, wherein if the rectangular edit area is longer in a column-direction than in a row-direction, at said first specifying step, the movement area is specified from a row including the edit-start point to a row including the edit-end point, and the row including the edit-end point is specified as the movement destination, and at said second specifying step, the row including the edit-start point and a row adjacent to the row including the edit-start point and opposite to the edit-end point are specified as the copy area, and rows of the movement area excluding the movement destination are specified as the copy destinations, and wherein at said movement step, the movement area is moved, and at said copying step, the copy area is copied at the copy destinations.

7. The image processing method according to claim 2, wherein the edit-start point and the edit-end point are designated by using a keyboard.

8. The image processing method according to claim 4, wherein the edit-start point and the edit-end point are designated by using a keyboard.

9. The image processing method according to claim 6, wherein the edit-start point and the edit-end point are designated by using a keyboard.

10. The image processing method according to claim 2, wherein the edit-start point and the edit end point are designated by using a pointing device.

11. The image processing method according to claim 4, wherein the edit-start point and the edit-end point are designated by using a pointing device.

12. The image processing method according to claim 6, wherein the edit-start point and the edit-end point are designated by using a pointing device.

13. The image processing method according to claim 1, wherein the copy area is extended in a lateral direction.

14. The image processing method according to claim 2, wherein the copy area is extended in a vertical direction.

15. The image processing method according to claim 3, wherein the copy area is extended in a lateral direction.

16. The image processing method according to claim 4, wherein the copy area is extended in a vertical direction.

17. An image processing apparatus comprising:

first designation means for designating an edit-start point on an edit area of a displayed image;

second designation means for designating an edit-end point on the edit area;

first specifying means for specifying a movement area to be moved and a movement destination;

second specifying means for specifying a copy area to be copied and a copy destination;

movement means for moving the movement area to the movement destination specified by said first specifying means; and copying means for copying the copy area at the copy destination specified by said second specifying means, wherein if the rectangular edit area is longer in a row-direction than in a column-direction, said first specifying means specifies the movement area from a column including the edit-start point to a column including the edit-end point, and specifies the column including the edit-end point as the movement destination, and said second specifying means specifies the column including the edit-start point as the copy area, and specifies columns of the movement area excluding the movement destination as the copy destinations, and wherein said movement means moves the movement area, and said copying means copies the copy area at the copy destinations.

18. The image processing apparatus according to claim 17, wherein if the rectangular edit area is longer in a column-direction than in a row-direction, said first specifying means specifies the movement area from a row including the edit-start point to a row including the edit-end point, and specifies the row including the edit-end point as the movement destination, and said second specifying means specifies the row including the edit-start point as the copy area, and specifies rows of the movement area excluding the movement destination as the copy destinations, and wherein said movement means moves the movement area, and said copying means copies the copy area at the copy destinations.

19. The image processing apparatus according to claim 17, wherein said first and second designation means are a pointing device.

20. An image processing apparatus comprising:

first designation means for designating an edit-start point on an edit area of a displayed image;

second designation means for designating an edit-end point on the edit area;

first specifying means for specifying a movement area to be moved and a movement destination;

second specifying means for specifying a copy area to be copied and a copy destination;

movement means for moving the movement area to the movement destination specified by said first specifying means; and copying means for copying the copy area at the copy destination specified by said second specifying means, wherein if the rectangular edit area is longer in a row-direction than in a column-direction, said first specifying means specifies the movement area from a column including the edit-start point to a column including the edit-end point, and specifies the column including the edit-end point as the movement destination, and said second specifying means specifies a column adjacent to the column including the edit-start point and opposite to the edit-end point as the copy area, and specifies columns of the movement area excluding the movement destination as the copy destinations, and wherein said movement means moves the movement area, and said copying means copies the copy area at the copy destinations.

21. The image processing apparatus according to claim 20, wherein if the rectangular edit area is longer in a column-direction than in a row-direction, said first specifying means specifies the movement area from a row including the edit-start point to a row including the edit-end point, and specifies the row including the edit-end point as the movement destination, and said second specifying means specifies a row adjacent to the row including the edit-start point and opposite to the edit-end point as the copy area, and specifies rows of the movement area excluding the movement destination as the copy destinations, and wherein said movement means moves the movement area, and said copying means copies the copy area at the copy destinations.

22. The image processing apparatus according to claim 20, wherein said first and second designation means are a pointing device.

23. An image processing apparatus comprising:

first designation means for designating an edit-start point on an edit area of a displayed image;

second designation means for designating an edit-end point on the edit area;

first specifying means for specifying a movement area to be moved and a movement destination;

second specifying means for specifying a copy area to be copied and a copy destination;

movement means for moving the movement area to the movement destination specified by said first specifying means; and copying means for copying the copy area at the copy destination specified by said second specifying means, wherein if the rectangular edit area is longer in a row-direction than in a column-direction, said first specifying means specifies the movement area from a column including the edit-start point to a column including the edit-end point, and specifies the column including the edit-end point as the movement destination, and said second specifying means specifies the column including the edit-start point and a column adjacent to the column including the edit-start point and opposite to the edit-end point as the copy area, and specifies columns of the movement area excluding the movement destination as the copy destinations, and wherein said movement means moves the movement area, and said copying means copies the copy area at the copy destinations.

24. The image processing apparatus according to claim 23, wherein if the rectangular edit area is longer in a column-direction than in a row-direction, said first specifying means specifies the movement area from a row including the edit-start point to a row including the edit-end point, and specifies the row including the edit-end point as the movement destination, and said second specifying means specifies the row including the edit-start point and a row adjacent to the row including the edit-start point and opposite to the edit-end point as the copy area, and specifies rows of the movement area excluding the movement destination as the copy destinations, and wherein said movement means moves the movement area, and said copying means copies the copy area at the copy destinations.

25. The image processing apparatus according to claim 19, wherein said first and second designation means are a keyboard.

26. The image processing apparatus according to claim 21, wherein said first and second designation means are a keyboard.

27. The image processing apparatus according to claim 23, wherein said first and second designation means are a keyboard.

28. The image processing apparatus according to claim 23, wherein said first and second designation means are a pointing device.

29. An image processing apparatus comprising:

first designation means for designating an edit-start point, in a displayed area, specifying a copy-start row or column which is copied and from which a copying area begins;

second designation means for designating an edit-end point, in the displayed area, specifying a copy-end row or column in which the copying area ends; and editing means for moving an image located between the copy-start column or the copy-start row and the end of the displayed area, and repeatedly copying said copy-start row or said copy-start column into the copying area, wherein it is determined based on the position of the edit-start point and the edit-end point, whether the edit-start point specifies a copy-start row or a copy-start column, whether the edit-end point specifies a copy-end row or a copy-end column, and whether said editing means moves the image in a row-direction or in a column direction.

30. The image processing apparatus according to claim 29, wherein, if the rectangular area defined by said edit-start point and said edit-end point is longer in the column-direction than in the row-direction, the image processing is executed in the direction of the row and, if the rectangular area defined by said edit-start point and said edit-end point is longer in the row-direction than in the column-direction, the image processing is executed in the direction of the column.

31. The image processing apparatus according to claim 29, wherein said image to be processed is a bitmap image.

32. The image processing apparatus according to claim 29, further comprising:

displaying means for displaying said image.

33. The image processing apparatus according to claim 29, wherein said first designation means and said second designation means are a pointing device.

34. An image processing method comprising:

a first designation step of designating an edit-start point, in a displayed area, specifying a copy-start row or column which is copied and from which a copying area begins;

a second designation step of designating an edit-end point, in the displayed area, specifying a copy-end row or column in which the copying area ends; and an editing step of moving an image located between the copy-start column or the copy-start row and the end of the displayed area, and repeatedly copying said copy-start row or said copy-start column into the copying area, and further comprising a step of determining, based on the position of the edit-start point and the edit-end point, whether the edit-start point specifies a copy-start row or a copy-start column, whether the edit-end point specifies a copy-end row or a copy-end column, and whether said editing means moves the image in a row-direction or in a column direction.

35. The image processing method according to claim 34, wherein, if the rectangular area defined by said edit-start point and said edit-end point is longer in the column-direction than in the row-direction, the image processing is executed in the direction of the row and, if the rectangular area defined by said edit-start point and said edit-end point is longer in the row-direction than in the column-direction, the image processing is executed in the direction of the column.

36. The image processing method according to claim 34, wherein said image to be processed is a bitmap image.

37. The image processing method according to claim 34, further comprising:

a displaying step of displaying said image.

38. The image processing method according to claim 34, wherein a pointing device is used for designating in said first designating step and said second designating step.

39. A computer-readable medium storing program codes for causing a computer to perform the steps of:

a first designation step of designating an edit-start point, in a displayed area, specifying a copy-start row or column which is copied and from which a copying area begins;

a second designation step of designating an edit-end point, in the displayed area, specifying a copy-end row or column in which the copying area ends; and an editing step of moving an image located between the copy-start column or the copy-start row and the end of the displayed area, and repeatedly copying said copy-start row or said copy-start column into the copying area, wherein said codes further control the computer to perform a step of determining, based on the position of the edit-start point and the edit-end point, whether the edit-start point specifies a copy-start row or a copy-start column, whether the edit-end point specifies a copy-end row or a copy-end column, and whether said editing means moves the image in a row-direction or in a column direction.

40. The computer-readable medium according to claim 39, containing program codes wherein, if the rectangular area defined by said edit-start point and said edit-end point is longer in the column-direction than in the row-direction, the image processing is executed in the direction of the row and, if the rectangular area defined by said edit-start point and said edit-end point is longer in the row-direction than in the column-direction, the image processing is executed in the direction of the column.

41. The computer-readable medium according to claim 39, containing program codes to process a bitmap image.

42. The computer-readable medium according to claim 39, further comprising program codes for causing a computer to perform the step of displaying said image.

43. The computer-readable medium according to claim 39, containing program codes that allow a pointing device to be used for designating in said first designating step and said second designating step.

44. An image processing apparatus comprising:

display means for displaying a pattern by using dots composing a two-dimensional dot-matrix;

first designation means for designating a dot, in the dot-matrix, specifying a copy-start row or copy-start column which is copied and from which a copying area begins;

second designation means for designating a dot, in the dot-matrix, specifying a copy-end row or copy-end column in which the copying area ends; and editing means for moving a part of the pattern, located between the copy-start column or the copy-start row and the end of the displayed area, and repeatedly copying said copy-start row or said copy-start column into the copying area, wherein it is determined based on the position of the two dots designated by said first designation means and said second designation means, respectively, whether the dot designated by said first designation means specifies a copy-start row or a copy-start column, whether the dot designated by said second designation means specifies a copy-end row or a copy-end column, and whether said editing means moves the part of the pattern in a row direction or in a column direction.

45. An image processing method comprising:

a displaying step of displaying a pattern by using dots composing a two-dimensional dot-matrix;

a first designating step of designating a dot, in the dot-matrix, specifying a copy-start row or copy-start column which is copied and from which a copying area begins;

a second designating step of designating a dot, in the dot-matrix, specifying a copy-end row or copy-end column in which the copying area ends; and an editing step of moving a part of the pattern, located between the copy-start column or the copy-start row and the end of the displayed area, and repeatedly copying said copy-start row or said copy-start column into the copying area, wherein it is determined based on the position of the two dots designated in said first designating step and said second designating step, respectively, whether the dot designated in said first designating step specifies a copy-start row or a copy-start column, whether the dot designated in said second designating step specifies a copy-end row or a copy-end column, and whether said editing step moves the part of the pattern in a row direction or in a column direction.

46. A computer-readable medium storing program codes for causing a computer to perform the steps of:

a displaying step of displaying a pattern by using dots composing a two-dimensional dot-matrix;

a first designating step of designating a dot, in the dot-matrix, specifying a copy-start row or copy-start column which is copied and from which a copying area begins;

a second designating step of designating a dot, in the dot-matrix, specifying a copy-end row or copy-end column in which the copying area ends; and an editing step of moving a part of the pattern, located between the copy-start column or the copy-start row and the end of the displayed area, and repeatedly copying said copy-start row or said copy-start column into the copying area, wherein it is determined based on the position of the two dots designated in said first designating step and said second designating step, respectively, whether the dot designated in said first designating step specifies a copy-start row or a copy-start column, whether the dot designated in said second designating step specifies a copy-end row or a copy-end column, and whether said editing step moves the part of the pattern in a row direction or in a column direction.

47. A program product comprising codes for causing a computer to perform the steps of:

a first designation step of designating an edit-start point, in a displayed area, specifying a copy-start row or column which is copied and from which a copying area begins;

a second designation step of designating an edit-end point, in the displayed area, specifying a copy-end row or column in which the copying area ends; and an editing step of moving an image located between the copy-start column or the copy-start row and the end of the displayed area, and repeatedly copying said copy-start row or said copy-start column into the copying area, wherein said codes further control the computer to perform a step of determining, based on the position of the edit-start point and the edit-end point, whether the edit-start point specifies a copy-start row or a copy-start column, whether the edit-end point specifies a copy-end row or a copy-end column, and whether said editing means moves the image in a row-direction or in a column direction.

* * * * *

UNITED STATES PATENT AND TRADEMARK OFFICE
CERTIFICATE OF CORRECTION

PATENT NO. : 6,112,213
DATED : August 29, 2000
INVENTOR(S) : Shigeki Koyama

It is certified that error appears in the above-identified patent and that said Letters Patent is hereby corrected as shown below:

References Cited
U.S. PATENT DOCUMENTS, insert:

-- 5,701,499   12/1997   Capson et al.   707/503 --.

OTHER PUBLICATIONS, insert:

-- CorelDRAW User's Manual-Version 4.0, Corel Corporation, 1993, pp. 424-428 --, and
-- Newton, Inside Generic CADD●, New Riders Publishing, 1991, pp. 325-332 --.

Column 5,
Line 8, "dx=xe-xs, dy=ye-y" should read -- dx=xe-xs, dy=ye-ys --.

Column 7,
Line 67, close up right margin.

Column 15,
Line 65, "claim 2," should read -- claim 1, --.

Column 16,
Line 1, "claim 4," should read -- claim 3, --.
Line 4, "claim 6," should read -- claim 5, --.
Line 7, "claim 2," should read -- claim 1, --.
Line 9, "claim 4," should read -- claim 3, --.
Line 12, "claim 6," should read -- claim 5, --.

UNITED STATES PATENT AND TRADEMARK OFFICE
CERTIFICATE OF CORRECTION

PATENT NO.    : 6,112,213
DATED         : August 29, 2000
INVENTOR(S)   : Shigeki Koyama It is certified that error appears in the above-identified patent and that said Letters Patent is hereby corrected as shown below:

Column 18,
Line 30, "19," should read -- 17, --.
Line 33, "21," should read -- 20, --.

Signed and Sealed this

Twenty-third Day of October, 2001

Attest:

NICHOLAS P. GODICI
Acting Director of the United States Patent and Trademark Office Attesting Officer